(12) United States Patent
Kurose et al.

(10) Patent No.: US 7,242,416 B2
(45) Date of Patent: Jul. 10, 2007

(54) OPTICAL HEAD

(75) Inventors: Mitsukazu Kurose, Nagano-ken (JP);
Yujiro Nomura, Nagano-ken (JP);
Kiyoshi Tsujino, Nagano-ken (JP); Ken Ikuma, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 293 days.

(21) Appl. No.: 11/006,498

(22) Filed: Dec. 7, 2004

(65) Prior Publication Data

US 2005/0140772 A1 Jun. 30, 2005

(30) Foreign Application Priority Data

| Dec. 9, 2003 | (JP) | ............................. 2003-410112 |
| Jan. 23, 2004 | (JP) | ............................. 2004-015549 |
| Jan. 23, 2004 | (JP) | ............................. 2004-015552 |
| Jan. 29, 2004 | (JP) | ............................. 2004-022163 |

(51) Int. Cl.
*B41J 2/45* (2006.01)
(52) U.S. Cl. ...................................... 347/132; 347/237
(58) Field of Classification Search ................ 347/112, 347/130–132, 237, 247
See application file for complete search history.

(56) References Cited

U.S. PATENT DOCUMENTS

| 2005/0068355 A1* | 3/2005 | Nomura et al. ................ 347/13 |
| 2005/0174419 A1* | 8/2005 | Kitazawa et al. ........... 347/118 |

FOREIGN PATENT DOCUMENTS

| JP | 61-182966 | 8/1986 |
| JP | 05-131679 | 5/1993 |
| JP | 06-183057 | 7/1994 |

* cited by examiner

*Primary Examiner*—Huan Tran
(74) *Attorney, Agent, or Firm*—Hogan & Hartson LLP

(57) ABSTRACT

An optical head that forms latent images on a photosensitive material by a multiple-exposure method is driven at higher speed. This optical head comprises a plurality of light emitting elements arranged in a specific direction, a storage unit for receiving and storing data corresponding to one pixel, a shift register having a plurality of registers respectively corresponding to the plurality of light emitting elements, the shift register receiving the data stored in the storage unit and successively shifting the data of each register, and an element drive circuit for lighting the corresponding light emitting elements on the basis of the data in each register of the shift register, wherein the plurality of light emitting elements arranged in the specific direction are successively lighted, and one pixel is subjected to multiple exposure.

13 Claims, 18 Drawing Sheets

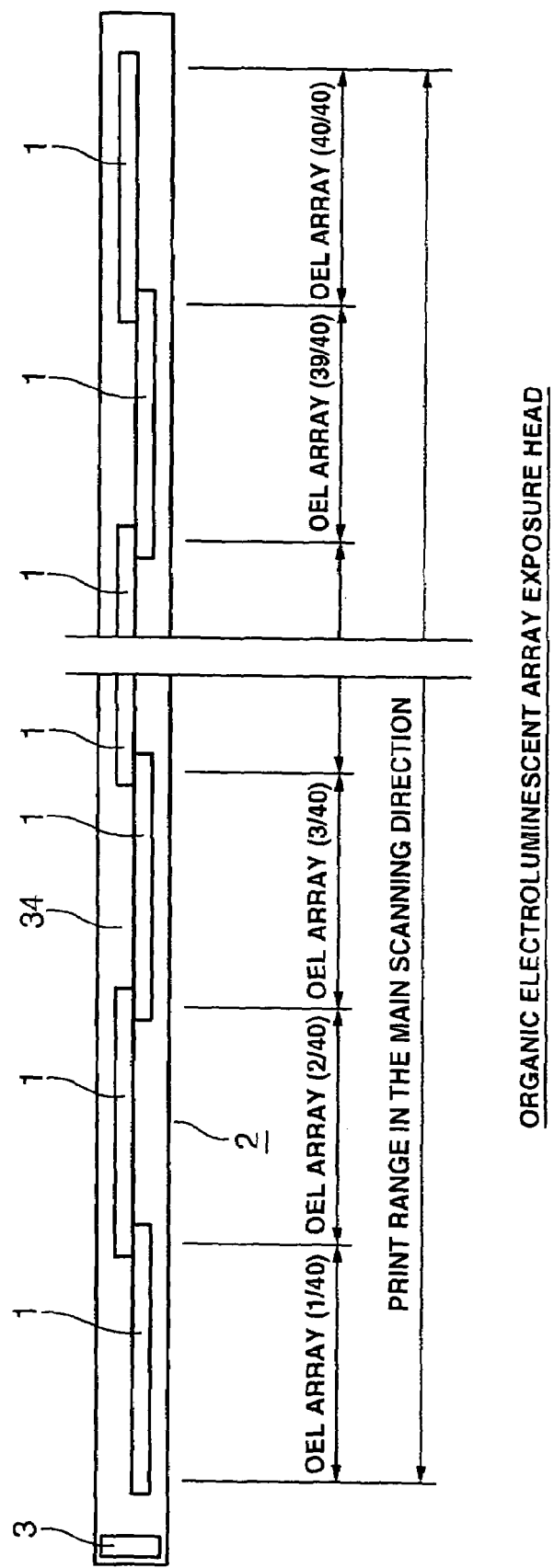

FIG.2B DIAGRAM ILLUSTRATING MOUNTED STATE OF HEAD CHIP

HEAD CHIP SPACING

ORGANIC ELECTROLUMINESCENT EXPOSURE ELEMENT LAYOUT

EXPOSURE LOCATIONS ON PHOTOSENSITIVE MATERIAL SURFACE

OTHER ORGANIC ELECTROLUMINESCENT EXPOSURE ELEMENT LAYOUT
(REFERENCE)

CIRCUIT OF ORGANIC ELECTROLUMINESCENT ARRAY EXPOSURE HEAD DRIVER

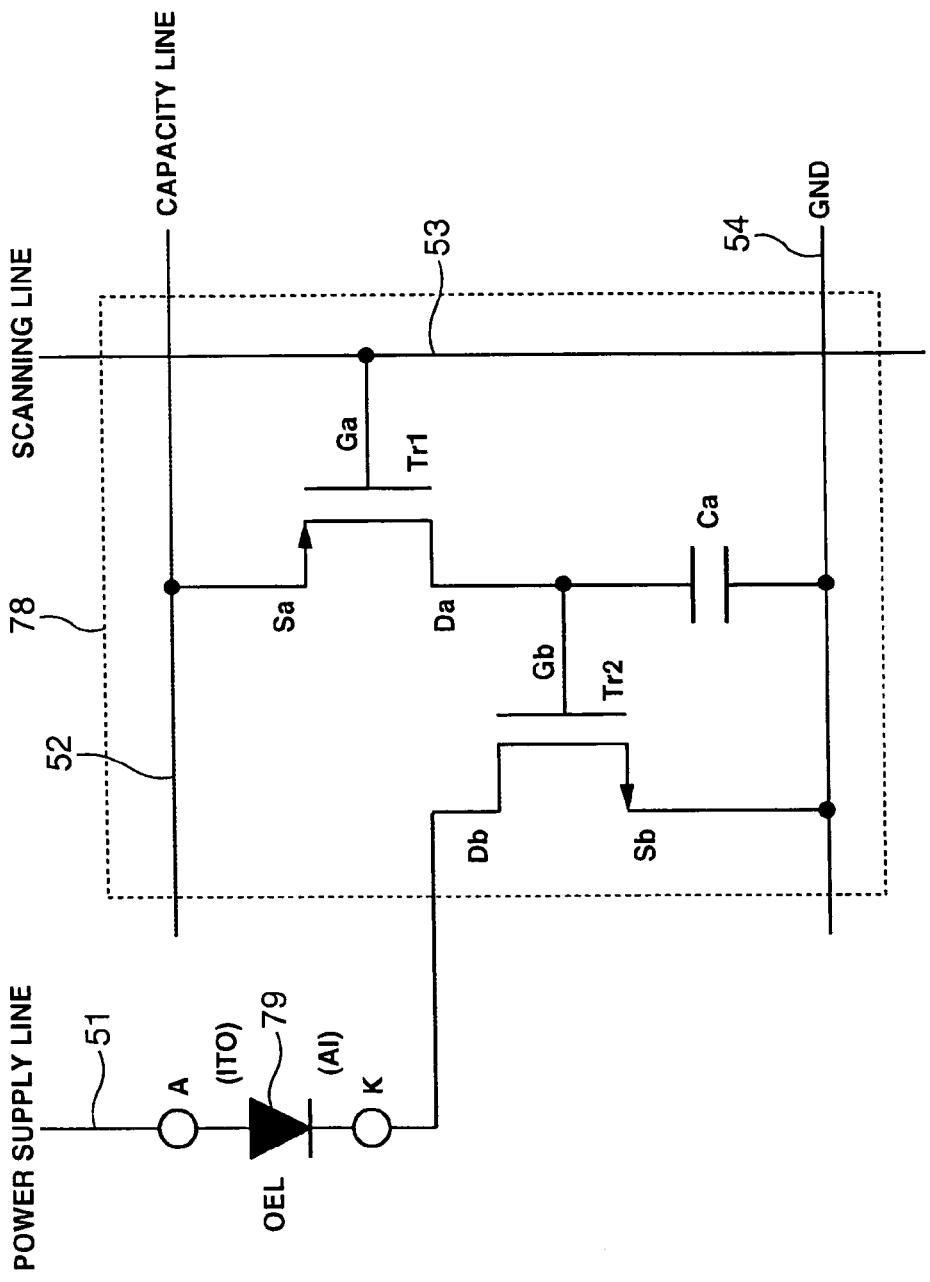

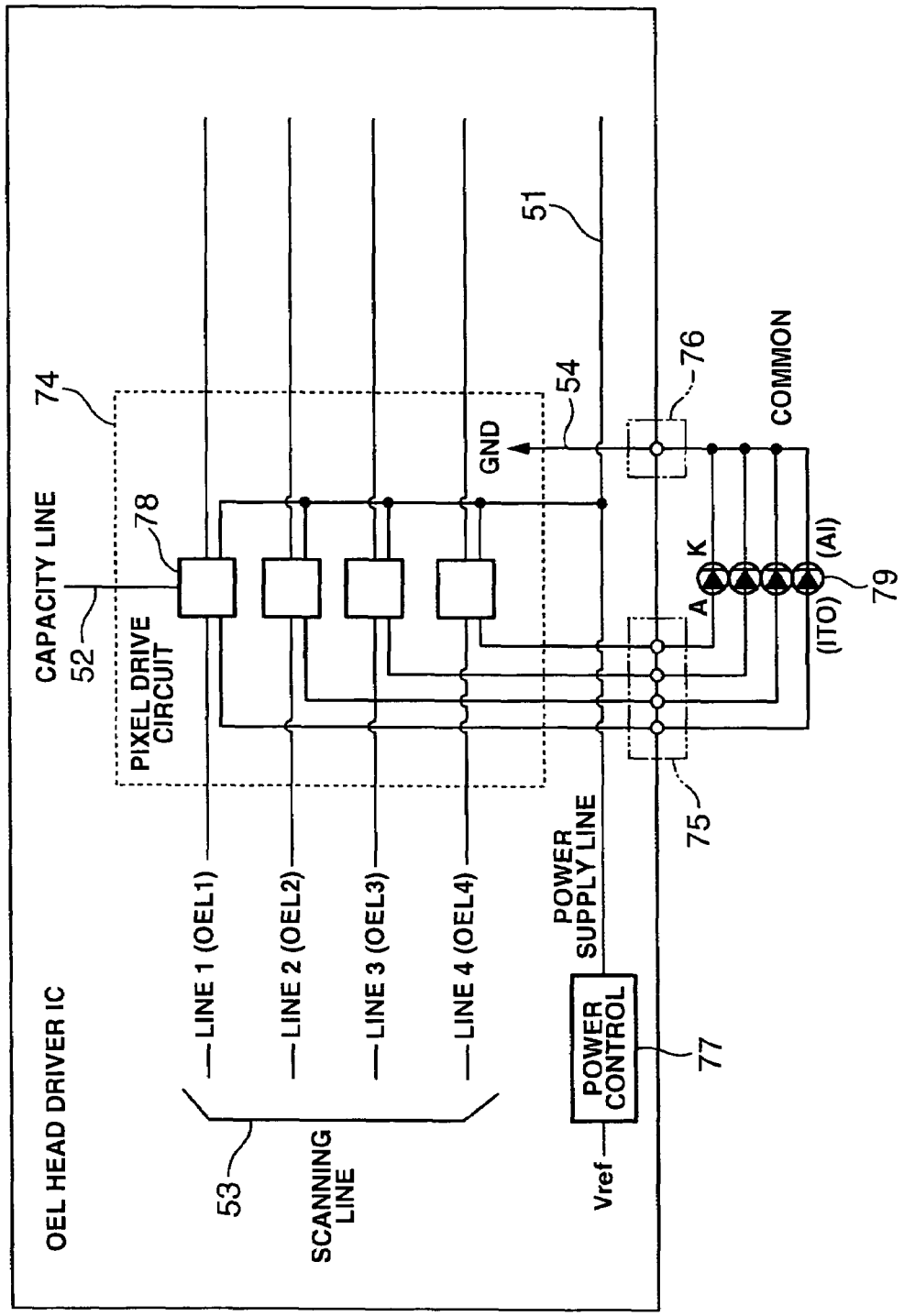

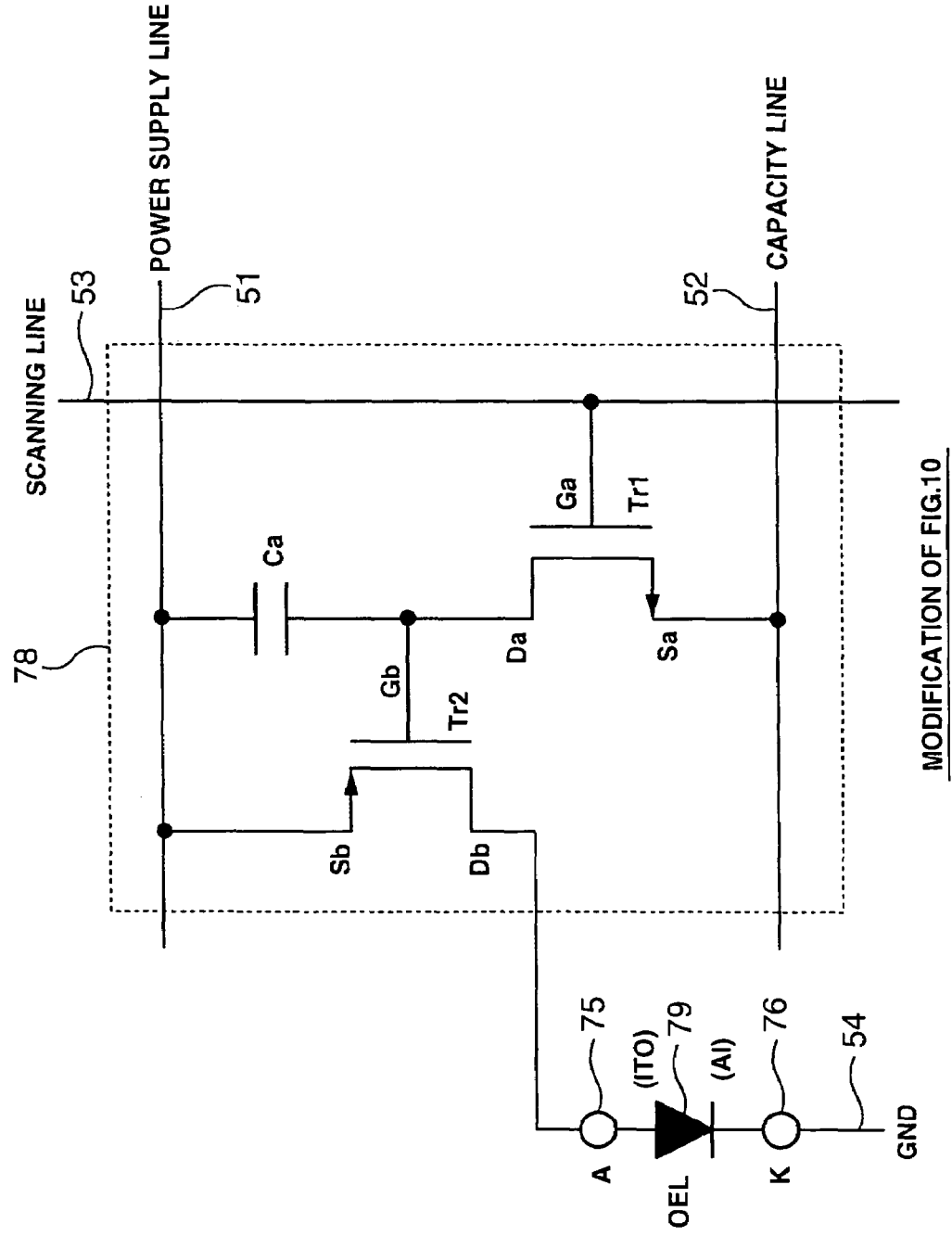

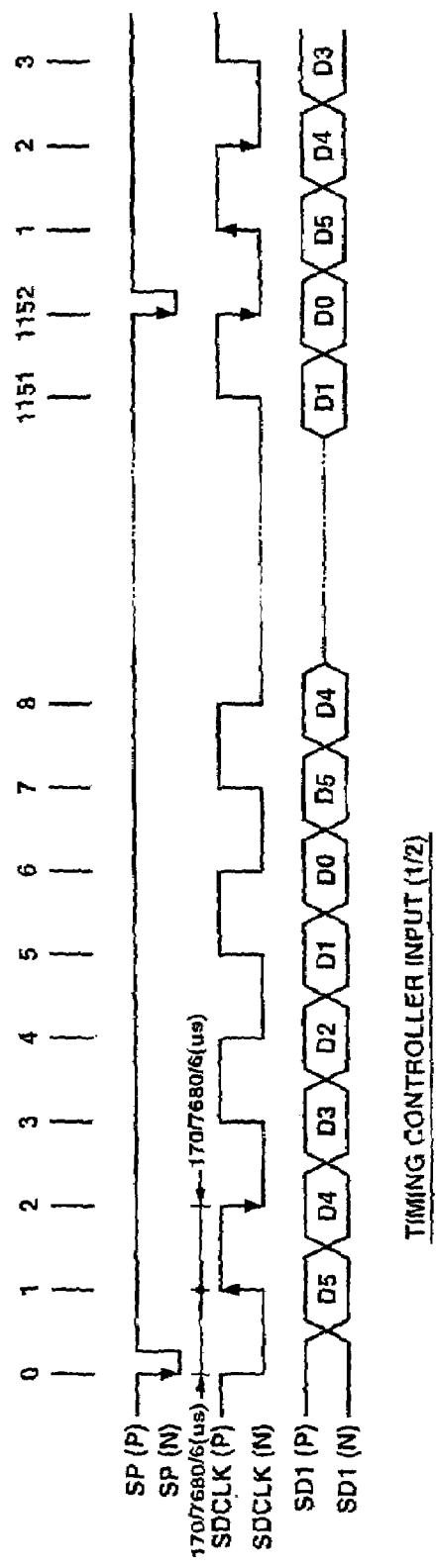
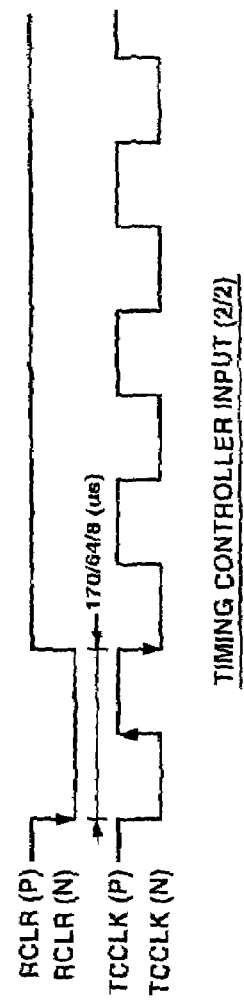
FIG.15A
FIG.15B

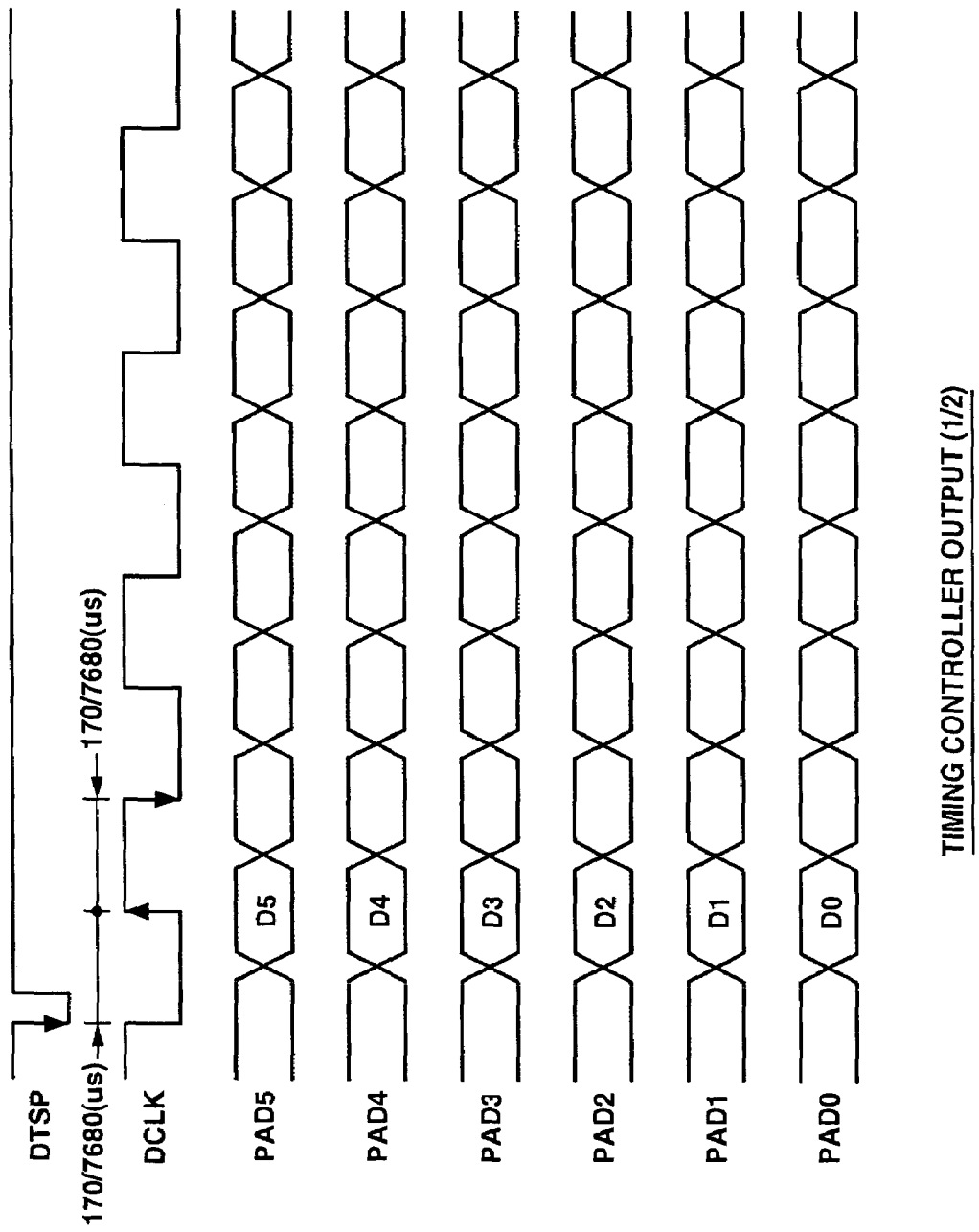

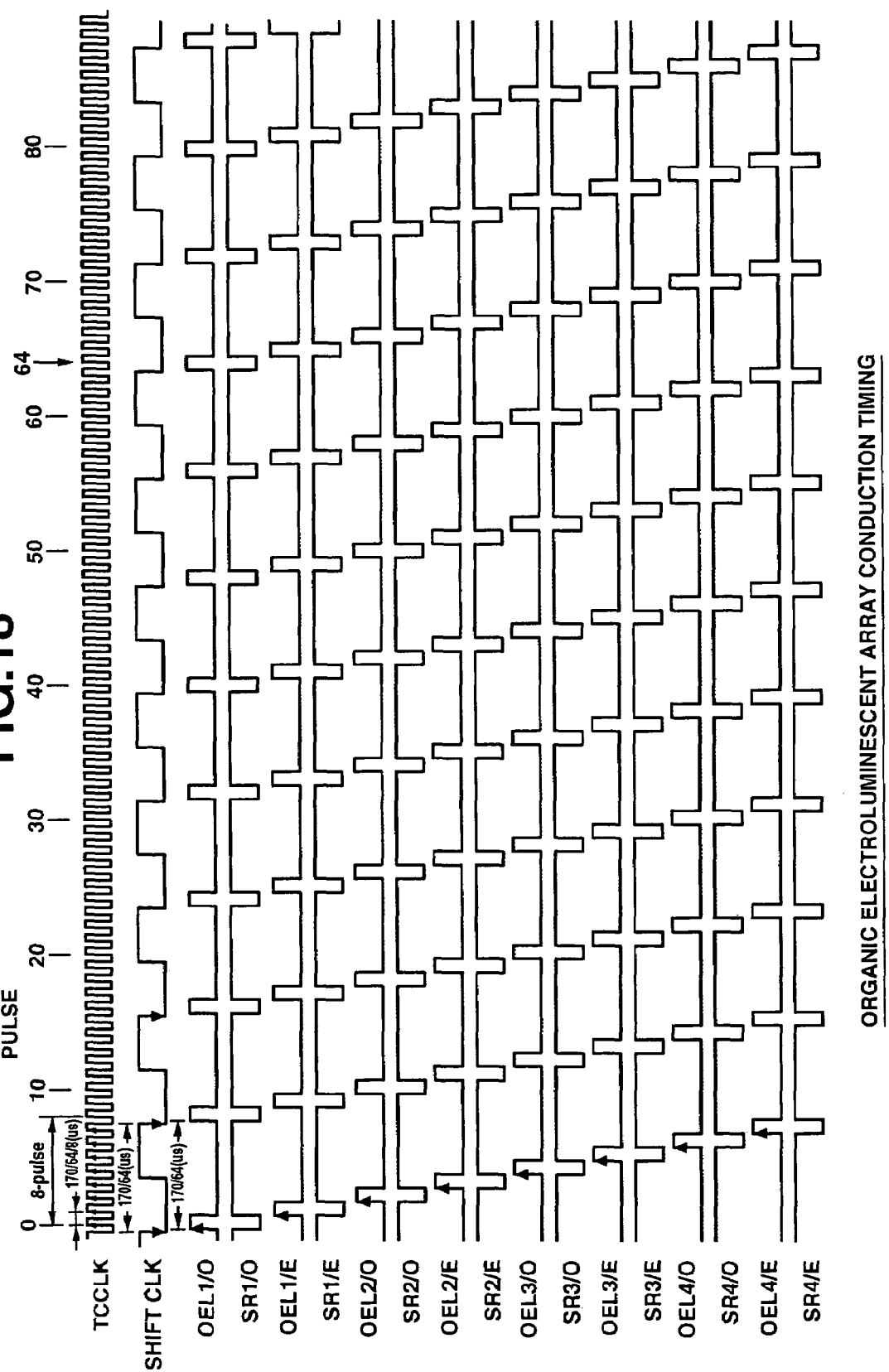

OPTICAL HEAD

CROSS-REFERENCES

BACKGROUND

The present invention relates to an optical head that forms latent images on a photosensitive material in an electrophotographic printer, copier, or the like.

An optical head that irradiates with exposure light of a specific pattern at a high speed in order to form an electrostatic latent image on a precharged photosensitive material is used in image formation devices such as printers and copiers.

Japanese Laid-Open Patent Application S61-182966 (Patent Document 1) discloses an image formation device with which a plurality of light emitting elements are arranged in a sub-scanning direction and recording is performed a plurality of times at the same position on a photosensitive material, the result being that printing speed can be raised without increasing the length of a single light emission duration, even when using light emitting elements with a low light emission output.

This image formation device has storage means for storing m×n pieces of image data, and performs n-number of multiple exposures by repeating n times the steps of (A) inputting one row of m pieces of image data to the storage means, (B) lighting a recording array head according to the image data stored in the storage means, and recording an electrostatic latent image on a photosensitive drum, and (C) shifting one row of the image data in the storage means to the next row.

SUMMARY

Problems Which the Invention is Intended to Solve

However, with the above-mentioned image formation device of Japanese Laid-Open Patent Application S61-182966, there is variance in the amount of light emission between the light emitting elements arranged in the main scanning direction and those in the sub-scanning direction, which results in the problem that an image of high quality cannot be formed.

In view of this, it is an object of the present invention to provide an optical head that forms latent images on a photosensitive material at a high speed.

Means Used to Solve the Above-Mentioned Problems

To solve the above-mentioned problems, the control device of the present invention is a control device for an optical head, which successively lights a plurality of light emitting elements arranged in a specific direction, and subjects one pixel to multiple exposure, comprising a storage unit for receiving and storing data corresponding to one pixel, a shift register having a plurality of registers respectively corresponding to the plurality of light emitting elements, the shift register receiving the data stored in the storage unit and successively shifting the data of each register, and an element drive circuit for lighting the corresponding light emitting elements on the basis of the data in each register of the shift register.

While light is being emitted on the basis of the data in the registers of the shift register, data for the next pixel can be received and stored, so there is no wasted time required for storage, and a multiple-exposure type of optical head can be driven at higher speed.

Another control device of the present invention is a control device for an optical head, which successively lights in a sub-scanning direction the respective light emitting elements of a light emitting element matrix in which a plurality of light emitting element groups arranged in the sub-scanning direction are further arranged in the main scanning direction, and subjects each of the plurality of pixels disposed in the main scanning direction to multiple exposure, comprising a storage unit for receiving pixel data for each pixel and storing data corresponding to the plurality of pixels disposed in the main scanning direction, a shift register group consisting of a plurality of shift registers respectively corresponding to the plurality of pixels disposed in the main scanning direction, each shift register having a plurality of registers respectively corresponding to the light emitting element groups arranged in the sub-scanning direction, each shift register receiving the data for each pixel stored in the storage unit, and the shift register group successively shifting the data of each register within the shift register, and an element drive circuit for lighting the corresponding light emitting elements on the basis of the data in each register of the shift register.

A plurality of pixels are provided in the main scanning direction, and therefore, even though storing data in the storage unit takes a long time, since data for the next pixel can be received and stored while light is being emitted on the basis of the data in the respective registers of the shift register, there is no wasted time required for storage, and a multiple-exposure type of optical head can be driven at higher speed.

With the above drive device, it is preferable if the light emitting elements are driven by the element drive circuit that relays the light emission state from the receipt of a light emission start signal until the receipt of a light emission end signal, and the light emission start signal and the light emission end signal for the element drive circuit of each light emitting element are each transmitted by a time division signal.

As a result, a light emission state can be achieved at the same point in time for a plurality of light emitting elements arranged in a specific direction or the sub-scanning direction, and furthermore, since there is no wasted time required for storage, as mentioned above, a multiple-exposure type of optical head can be driven at higher speed.

With the above drive device, it is preferable if the element drive circuit is equipped with a plurality of first signal lines and with second signal lines that intersect with the first signal lines, and is constituted such that the light emission of the light emitting elements located at the intersections between two signal lines is started and ended by switching the second signal lines on or off when the first signal lines are active, and the start and end of the light emission of the respective light emitting elements are controlled by synchronizing the on/off state of the second signal lines with the active signal output of the first signal lines, and shifting the active signal output time to the first signal lines for another element drive circuit that shares the second signal lines.

As a result, active matrix drive by time division control can be achieved, and a multiple-exposure type of optical head can be driven at higher speed.

With the above drive device, it is preferable if the device further comprises a comparator for comparing the data in the respective registers of the shift register with the output of a counter of the same number of bits as each register, and outputting the result to the second signal lines, and the counter is shared with another element drive circuit that shares the second signal lines, and the period of the counter is longer than the shift in the output time of the active signals to the plurality of first signal lines.

As a result, there is no need to provide numerous counters, which simplifies the circuit configuration and achieves time division drive, allowing a multiple-exposure type of optical head to be driven at higher speed.

With the above drive device, it is preferable if the comparator is shared with another element drive circuit that shares the second signal lines, and the comparison of the data acquisition of each register with the counter is synchronized with the active signal output to the first signal lines.

As a result, there is no need to provide numerous comparators, which simplifies the circuit configuration and achieves time division drive, allowing a multiple-exposure type of optical head to be driven at higher speed.

The optical head of the present invention comprises a plurality of light emitting elements arranged in a specific direction, a storage unit for receiving and storing data corresponding to one pixel, a shift register having a plurality of registers respectively corresponding to the plurality of light emitting elements, the shift register receiving the data stored in the storage unit and successively shifting the data of each register, and an element drive circuit for lighting the corresponding light emitting elements on the basis of the data in each register of the shift register.

Since data for the next pixel can be received and stored while light is being emitted on the basis of the data in the respective registers of the shift register, there is no wasted time required for storage, and a multiple-exposure type of optical head can be driven at higher speed.

Another optical head of the present invention comprises a light emitting element matrix in which a plurality of light emitting element groups arranged in the sub-scanning direction are further arranged in the main scanning direction, a storage unit for receiving pixel data for each pixel and storing data corresponding to the plurality of pixels disposed in the main scanning direction, a shift register group consisting of a plurality of shift registers respectively corresponding to the plurality of pixels disposed in the main scanning direction, each shift register having a plurality of registers respectively corresponding to the light emitting element groups arranged in the sub-scanning direction, each shift register receiving the data for each pixel stored in the storage unit, and the shift register group successively shifting the data of each register within the shift register, and an element drive circuit for lighting the corresponding light emitting elements on the basis of the data in each register of the shift register.

A plurality of pixels are provided in the main scanning direction, and therefore, even though storing data in the storage unit takes a long time, since data for the next pixel can be received and stored while light is being emitted on the basis of the data in the respective registers of the shift register, there is no wasted time required for storage, and a multiple-exposure type of optical head can be driven at higher speed.

Another optical head of the present invention comprises a light emitting element group having a plurality of light emitting elements arranged in a specific direction, a plurality of light emitting data memories provided corresponding to the plurality of light emitting elements, for storing light emission data indicating the light emission time of the corresponding light emitting elements, a plurality of correction data memories provided corresponding to the plurality of light emitting elements, for storing correction data correcting the light emission times of the corresponding light emitting elements, a light emission data correction unit for correcting the light emission data corresponding to the correction data on the basis of the correction data, and an element drive circuit for lighting the light emitting elements on the basis of the corrected light emission data. It is preferable for the light emitting elements to be organic electroluminescent elements.

With the above constitution, a memory for storing correction data that corrects the amount of light emission of a light emitting element is provided to every light emitting element, and this amount of light emission is corrected for every light emitting element. Therefore, even if there is variance in the amount of light emission between a plurality of light emitting elements, the amounts of light emission can be corrected for individual light emitting elements, so the amount of light emission of the optical head can be controlled as desired, such as keeping the amount of light emission of the optical head uniform. Also, the correction data may be set and the amount of light emission of the individual light emitting elements may be corrected so that when the optical head has a plurality of light emitting element modules provided with a plurality of light emitting elements, the amount of light emission will be uniform among the light emitting element modules. The plurality of light emission data memories and correction data memories may be memories that constitute shift registers.

With the above optical head, it is preferable if the plurality of correction data memories store the correction data for the light emitting elements corresponding to the respective correction data memories by successively shifting the correction data to the plurality of correction data memories, the plurality of light emission data memories store the light emission data for the light emitting elements corresponding to the respective light emission data memories by successively shifting the light emission data to the plurality of light emission data memories when the correction data have been stored in the plurality of correction data memories, and the element drive circuit lights the plurality of light emitting elements when the plurality of correction data memories have shifted the plurality of light emission data and stored them in the plurality of light emission data memories.

With the above constitution, the plurality of light emission data memories store light emission data when the necessary correction data have been stored in the plurality of correction data memories. Also, while the element drive circuit is lighting the plurality of light emitting elements on the basis of the light emission data stored in the plurality of light emission data memories, the next light emission data are shifted and stored in the plurality of light emission data memories. In this case, the necessary correction data have already been stored in the correction data memories, and there is no need for the correction data memories to further shift or store correction data, so there is less wasted time required for storage, and the optical head can be driven at higher speed.

It is preferable if the above-mentioned optical head further comprises a controller for producing a plurality of bit data composed of a plurality of bits, as the light emission data or the correction data, and a plurality of shift registers provided corresponding to the plurality of light emitting elements, for successively shifting the plurality of bit data, wherein the correction data memories store the bit data as correction data when a specific bit in the bit data stored in the corresponding shift registers exhibits a specific value, and the light emission data memories store the bit data as the light emission data when the specific bit in the bit data stored in the corresponding shift registers exhibits another value.

Here, it is preferable if the light emission data correction unit has an addition unit for correcting light emission data by adding the correction data to the light emission data. Also, the light emission data memories and correction data memories may be memories that constitute the shift registers.

With the above constitution, the light emission data memories and correction data memories determine whether the bit data are light emission data or correction data on the basis of the bit value of the bit data. Therefore, since the shift registers and/or the light emission data memories and correction data memories are able to shift light emission data and correction data at high speed and store these data at high speed, there is less wasted time required for storage, and an optical head that can be driven at higher speed can be provided.

Another optical head of the present invention comprises a light emitting element group having a plurality of light emitting elements arranged in a specific direction, a storage unit having a plurality of memories provided corresponding to the plurality of light emitting elements, for storing light emission data indicating the light emission time of the plurality of light emitting elements, and an element drive circuit for lighting the plurality of light emitting elements on the basis of the light emission data when corresponding light emission data have been stored in the respective plurality of memories. It is preferable here if the storage unit is a first shift register for successively shifting the light emission data to the plurality of memories, and the element drive circuit lights the plurality of light emitting elements when the first shift register has shifted the plurality of light emission data and stored them in the plurality of memories.

With the above constitution, while the element drive circuit is lighting the plurality of light emitting elements on the basis of the light emission data stored in the plurality of memories, the storage unit shifts the next light emission data and stores them in the plurality of memories. Therefore, with this constitution, there is less wasted time required for storage, and an optical head that can be driven at higher speed can be provided.

It is preferable if the above-mentioned optical head further comprises a light emitting element matrix in which a plurality of the light emitting element groups arranged in a specific direction are arranged in a direction substantially perpendicular to the specific direction, and a plurality of second shift registers provided corresponding to the plurality of memories, wherein the second shift registers have a plurality of registers provided corresponding to the respective plurality of light emitting elements arranged in the substantially perpendicular direction in the light emitting element matrix, and the light emission data stored in the memories corresponding to the second shift registers are successively shifted and stored in the plurality of registers, and the element drive circuit lights the light emitting elements corresponding to the registers on the basis of the light emission data stored in the registers.

With the above constitution, even if the optical head has numerous light emitting elements in the above-mentioned specific direction (such as the main scanning direction), while the element drive circuit is lighting the light emitting elements on the basis of the data in the each register of the second shift registers, the storage unit and/or other registers are receiving and storing data for the next pixel. Therefore, with the above constitution, even when the optical head forms images by a multiple exposure method, there is less wasted time required for storage, and an optical head that can be driven at higher speed can be provided.

It is preferable if the above-mentioned optical head further comprises a counter for keeping a count value that controls the light emission time of the light emitting elements, and a plurality of comparators provided corresponding to the respective plurality of second shift registers, for comparing the light emission data stored in a specific register, out of the corresponding plurality of registers, with the count value of the counter, wherein the element drive circuit starts or stops the lighting of the light emitting elements corresponding to the specific register when the comparators have determined that the count value matches the light emission data.

With the above constitution, the timing at which the lighting of the respective light emitting elements is started and stopped is set according to the light emission data and the count value. Therefore, with the above constitution, a plurality of light emitting elements provided in the above-mentioned substantially perpendicular direction can be driven in time division with an extremely simple constitution.

Another control device of the present invention comprises a light emitting element group having a plurality of light emitting elements arranged in a specific direction, a plurality of memories provided corresponding to the plurality of light emitting elements, for storing light emission data indicating the light emission time of the plurality of light emitting elements, a counter for keeping a count value that controls the light emission time of the light emitting elements, a plurality of comparators provided corresponding to the respective plurality of memories, for comparing the light emission data stored in the corresponding memories with the count value of the counter, and an element drive circuit for controlling the lighting of the light emitting elements corresponding to a specific memory on the basis of the result of the comparators comparing the count value with the light emission data stored in the specific memory.

With the above constitution, the light emission time of a plurality of light emitting elements can be controlled with an extremely simple constitution.

It is preferable if the above-mentioned optical head further comprises a light emitting element matrix in which a plurality of the light emitting element groups arranged in the specific direction are arranged in a direction substantially perpendicular to the specific direction, and a plurality of second shift registers provided corresponding to the plurality of memories and the plurality of comparators, wherein the second shift registers have a plurality of registers provided corresponding to the respective plurality of light emitting elements arranged in the substantially perpendicular direction in the light emitting element matrix, and the light emission data stored in the memories corresponding to the second shift registers are successively shifted and stored in the plurality of registers, the comparators compare the count value with the light emission data stored in a specific register out of the plurality of registers, and the element drive circuit controls the lighting of the light emitting elements corresponding to a specific register on the basis of the result of the comparators comparing the count value with the light emission data stored in the specific register.

With the above constitution, the light emission time of a plurality of light emitting elements can be controlled with an extremely simple constitution, and multiple exposure can be performed with a plurality of light emitting elements arranged in the above-mentioned substantially perpendicular direction. Also, with the above constitution, data for the next pixel is being received and stored during the lighting of the light emitting elements on the basis of the data stored in each register of the shift registers, so there is less wasted time required for storage, and an optical head that can be driven at higher speed can be provided.

With the above-mentioned optical head, it is preferable if the element drive circuit starts or stops the lighting of the light emitting elements when the count value matches the light emission data. Also, with the above-mentioned optical head, it is preferable if the element drive circuit controls the light emitting elements so that one operation of either starting or stopping the lighting of the light emitting elements is performed when the count value matches the light emission data, and controls the light emitting elements so that the other operation of starting or stopping the lighting of the light emitting elements is performed when the count value matches a predetermined value.

With the above constitution, the lighting of the light emitting elements is started on the basis of either the above-mentioned specific count value or the light emission data, and the lighting of the light emitting elements is stopped on the basis of the other of these. Therefore, with this constitution, a plurality of light emitting elements can be driven in time division with an extremely simple constitution.

DESCRIPTION OF THE DRAWINGS

FIG. 1 is a plan view of an organic electroluminescent array exposure head pertaining to the present invention, as seen from above;

FIG. 4b is a plan view illustrating the exposure position when a photosensitive material surface is exposed using the organic electroluminescent array exposure head shown in FIG. 4a;

FIG. 5 is a reference plan view of the element layout of an organic electroluminescent exposure head pertaining to a modification of FIG. 4a;

FIG. 12 is a detailed diagram of the circuitry of an organic electroluminescent driver;

FIG. 13 is a diagram of the circuit structure of the driver of an organic electroluminescent array exposure head pertaining to the modification of FIG. 11;

FIG. 14 is a detailed diagram of the circuitry of an organic electroluminescent driver pertaining to the modification of FIG. 12;

FIG. 15 is a diagram of the timing related to the image data (light emission time data) reception of a driver IC;

FIG. 16 is a diagram of the timing at which image data are transmitted to a shift register in the main axial direction;

FIG. 18 is a diagram of the details of electrical conduction timing of the plurality of lines constituting the organic electroluminescent array, with respect to organic electroluminescence.

DETAILED DESCRIPTION

Figure 2A:
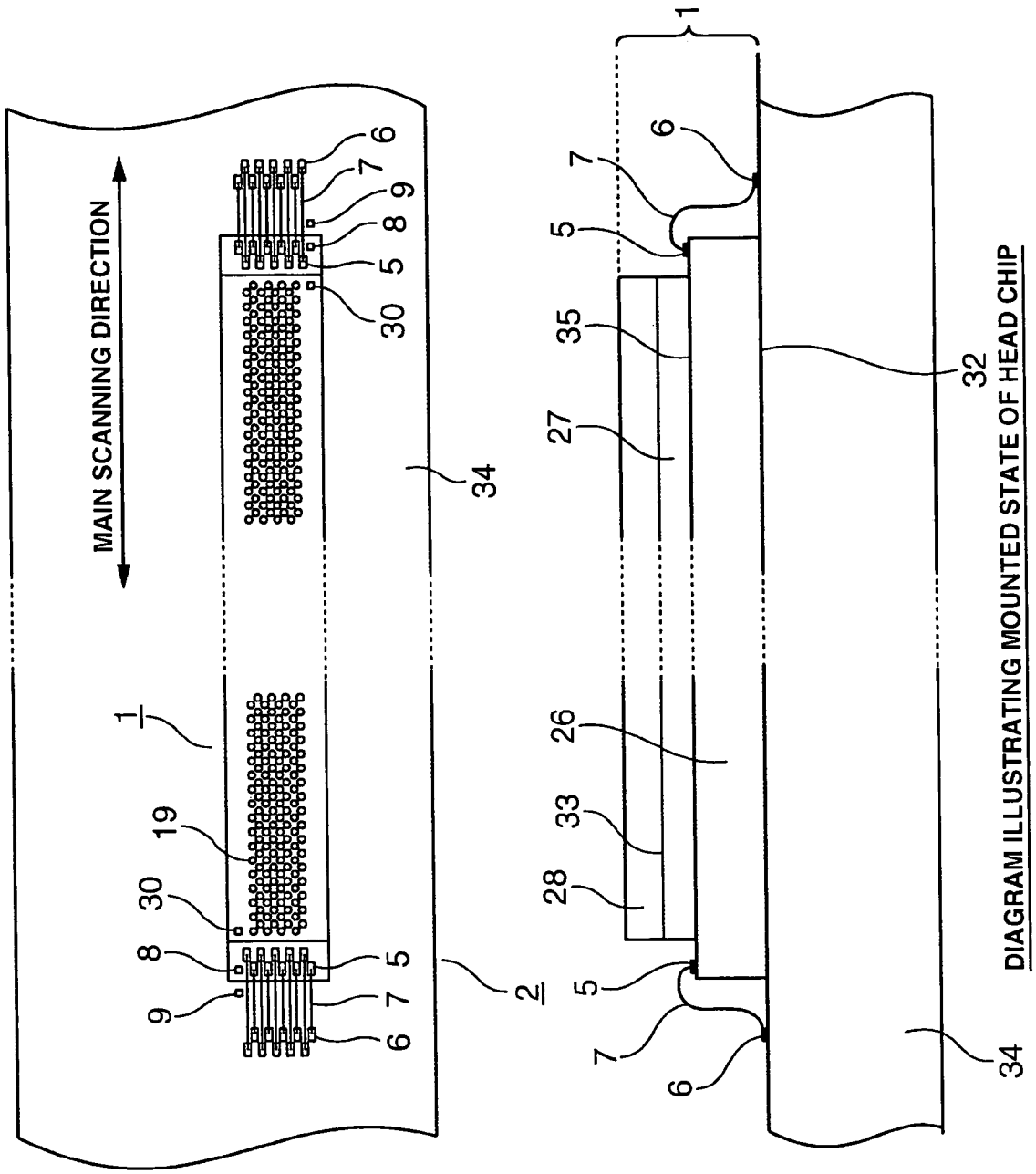
FIG. 2 is a diagram illustrating one head chip 1 after having been mounted on a substrate 34, with FIG. 2a being a plan view thereof, and FIG. 2b a cross section in the lengthwise direction thereof.

Embodiments of the invention will now be described through reference to the drawings. First, the organic electroluminescent array exposure head pertaining to the present invention and the structure of an organic electroluminescent array exposure head chip will be described, after which the operation when the organic electroluminescent array exposure head pertaining to the present invention is used to perform exposure time division and multiple exposure control will be described.

1. Overall Structure of Organic Electroluminescent Array Exposure Head

FIG. 1 is a plan view of an organic electroluminescent array exposure head pertaining to the present invention, as seen from above. In the drawing, 1 is an organic electroluminescent array exposure head chip (hereinafter referred to simply as head chip), 2 is an organic electroluminescent array exposure head (hereinafter referred to simply as exposure head), 3 is a connector for receiving data from a printer controller (not shown), and 34 is a substrate on which the connector 3 and the head chip 1 are mounted. A glass cloth substrate or an epoxy resin layer substrate, for example, can be used for this purpose.

The substrate 34 is formed in a rectangular shape, with its long axis being the main scanning direction. The connector 3 for receiving data from a printer controller is mounted at one end in this main scanning direction, and a plurality of head chips 1 are mounted on the rest of the substrate. Although not shown in FIG. 1, each head chip 1 is electrically connected to the connector 3.

In FIG. 1, the plurality of head chips 1 are disposed in two zigzagging rows. In the first row, a plurality of head chips 1 are disposed at a spacing that is somewhat less than the length of each head chip 1 in the main scanning direction, and in the second row, a plurality of head chips 1 are disposed at the same spacing as the first row in the places where the head chips 1 of the first row are not disposed. This spacing will be discussed below. "Row direction" as used hereinafter means the sub-scanning direction.

How many head chips 1 are mounted on the substrate 34 may be determined on the basis of the number of organic electroluminescent light emitting components (hereinafter referred to simply as light emitting components) formed in the main scanning direction on a head chip 1, the maximum image formation length in the main scanning direction, and other such factors. For instance, if we assume that 192 light emitting components are formed in the main scanning direction on a single head chip 1, and if images are to be formed at a resolution of 600 dpi on A4-size paper, then 40 head chips 1 may be disposed in two zigzagging rows on the substrate 34.

FIG. 2 is a diagram illustrating one head chip 1 after having been mounted on the substrate 34, with FIG. 2a being a plan view thereof, and FIG. 2b a cross section in the lengthwise direction thereof. In FIG. 2, 5 is a bonding pad on the head chip 1 side, 6 is a bonding pad on the substrate 34 side, 7 is a bonding wire, 8 is a pad for positioning on the head chip 1 side, 9 is a pad for positioning on the substrate 34 side, 19 is a light guide hole of a condensing lens assembly 28, 26 is a driver IC for controlling the light emission of the light emitting components formed on an organic electroluminescent array assembly (hereinafter referred to simply as array assembly) 27, 27 is this array assembly, 28 is the condensing lens assembly, 30 is a pad for positioning on the condensing lens assembly 28 side, 32 is a die bond material, 33 is an ultraviolet (UV) curing resin adhesive, and 35 is an anisotropic electroconductive adhesive. Those components that are the same as in FIG. 1 are numbered the same. FIGS. 2a and 2b omit the details from the middle portion.

The driver IC 26 is at the very bottom of the head chip 1. The array assembly 27 is provided directly over this IC, and the condensing lens assembly 28 is provided directly over this array assembly. This head chip 1 is fixed with the die bond material 32 to the substrate 34. The positioning of the substrate 34 and the head chip 1 in the fixing of the head chip 1 to the substrate 34 is accomplished by means of the positioning pads 8 on the head chip 1 side and the positioning pads 9 on the substrate 34 side. Specifically, as shown in FIG. 2a, two positioning pads 9 are formed at the position where the head chip 1 is to be fixed to the substrate 34, at a spacing substantially equal to the length of the head chip 1 in the main scanning direction, positioning pads 8 are formed on the head chip 1, and more specifically at the ends of the driver IC 26 in the main scanning direction, so as to be across from the positioning pads 9 on the substrate 34 side, and the components are fixed by aligning the positioning pads 8 on the head chip 1 side so as to be across from the positioning pads 9 on the substrate 34 side.

The head chip 1 has a structure in which the array assembly 27 is bonded directly on the driver IC 26 with the anisotropic electroconductive adhesive 35, and the condensing lens assembly 28 is bonded directly on the array assembly 27 with the UV curing resin adhesive 33. As shown in FIG. 2b, the main scanning direction length and the sub-scanning direction width of the condensing lens assembly 28 are substantially the same, and the main scanning direction length of the driver IC 26 is greater than the main scanning direction length of the array assembly 27 and the condensing lens assembly 28. The sub-scanning direction width of the driver IC 26 is substantially the same as the sub-scanning direction width of the array assembly 27 and the condensing lens assembly 28.

The order in which the driver IC 26, the array assembly 27, and the condensing lens assembly 28 are bonded is as follows. First, the array assembly 27 is positioned with respect to and bonded to the driver IC 26, and then the condensing lens assembly 28 is positioned with respect to the driver IC 26 and bonded on the array assembly 27.

On the portion of the driver IC 26 other than the portions where the array assembly 27 is bonded at both ends, a specific number of wire bonding pads 5 are formed, and wire bonding pads 6 that are the same as the wire bonding pads 5 are formed on the substrate 34. The wire bonding pads 5 of the driver IC 26 are electrically connected by bonding wires 7 to the corresponding wire bonding pads 6 on the substrate 34 side.

The wire bonding pads 6 on the substrate 34 side are provided, for example, in order to supply various kinds of signal from the connector 3 shown in FIG. 1 to the driver IC 26, or to supply power supply voltage or ground potential from a power supply circuit (not shown) to the driver IC 26. The wire bonding pads 6 may be connected to the connector 3 or to the power supply circuit by first forming a wiring pattern (not shown) for this purpose on the substrate 34.

In FIG. 2, 20 pairs of the wire bonding pads 5 and 6 are provided, but the number of pairs of wire bonding pads may be suitably determined on the basis of the number of signals to be supplied to the driver IC 26 and other such factors.

A plurality of rows of the light guide holes 19 are then formed in the condensing lens assembly 28. Specifically, the light guide holes 19 are formed in a specific number in the main scanning direction, and a plurality of these rows are formed in the sub-scanning direction. The light guide holes 19 here are formed in one-to-one correspondence with the light emitting components formed in the array assembly 27. Specifically, in FIG. 2a, a light emitting component is formed directly below each light guide hole 19.

The number of light guide holes 19 formed in the main scanning direction, that is, the number of light emitting components formed in the array assembly 27 in the main scanning direction, may be determined as dictated by the required resolution. In this example, as mentioned above, 192 light guide holes and light emitting components are formed in the main scanning direction. Of these 192, odd-numbered light guide holes and light emitting components are formed in a first row in the sub-scanning direction, and even-numbered light guide holes and light emitting components are formed in a second row in the sub-scanning direction, and this continues until 192×4 light guide holes and light emitting components have been formed in a total of 8 zigzagging rows on a single head chip 1. The number of rows in which the light guide holes and light emitting components are disposed in the sub-scanning direction may be determined on the basis of the amount of light to be emitted by the light emitting components and other such factors, and the rows may be disposed in a regular grid pattern rather than a zigzag pattern.

Further, when the light emitting components and the light guide holes 19 are formed in a zigzag pattern as shown in FIG. 2a, depending on the required resolution, the exposure of a single line of the image being formed may be performed with just one row of the light guide holes 19. From the standpoint of resolution, however, it is preferable to expose one line of image with the light emitting components and the light guide holes 19 disposed in two zigzagging rows, so that one line of image is exposed by the first and second rows of light emitting components and light guide holes 19, and the adjacent line is exposed by the third and fourth rows of light emitting components and light guide holes 19. In the case shown in FIG. 2a, the former allows 8 lines of image to be exposed, while the latter allows 4 lines of image to be exposed.

Figure 3:
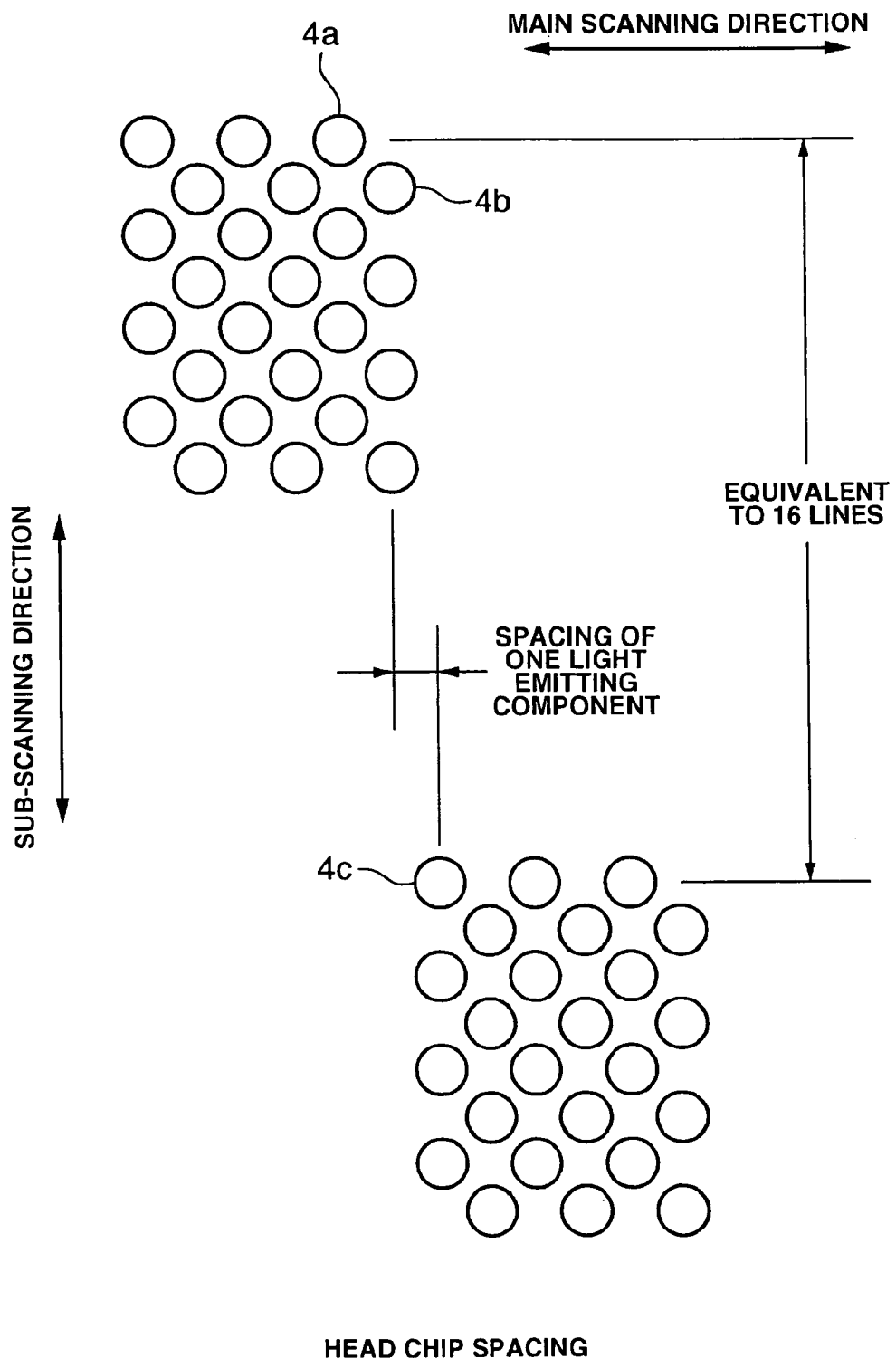
FIG. 3 is a plan view illustrating the spacing of the head chips 1 in each row, when the head chips 1 are disposed in two zigzagging rows.

The spacing of the head chips 1 in each row when the head chips 1 are disposed in two zigzagging rows as shown in FIG. 1 will now be described through reference to FIG. 3. In FIG. 3, 4a is the first row of light emitting components of one head chip 1 in the first row in FIG. 1, 4b is the light emitting components on the right edge of this head chip 1, and 4c is the first row of light emitting components in the second row of head chips 1 disposed in a zigzag pattern with the above-mentioned head chip 1. The light emitting components 4b and the light emitting components 4c are disposed apart from each other in the main scanning direction, at the same spacing as the spacing of the light emitting components in each row. The effect of this disposition is that the spacing between pixels in the main scanning direction remains constant even where the head chips 1 are disposed in a zigzag pattern.

Also, as shown in FIG. 3, the light emitting components 4a and the light emitting components 4c are separated in the sub-scanning direction by a distance equivalent to 16 rows of light emitting components. This deviation by 16 rows can be resolved by processing the order of image data output in a suitable process in which print image data are produced by a print controller and outputted to an exposure head 2.

The head chips 1 are fixed to the substrate 34 in two zigzagging rows so as to achieve the layout described above.

The above is a description of the overall structure of the exposure head 2, and the respective components thereof will now be described. First, the substrate 34, as discussed above, can consist of an insulating material, such as a glass cloth substrate or an epoxy resin layer substrate. The positioning pads 9 and the wire bonding pads 6 used for positioning when the head chip 1 is being fixed are formed at specific locations on the substrate 34, and the connector 3 is provided at one end thereof.

Figure 4A:
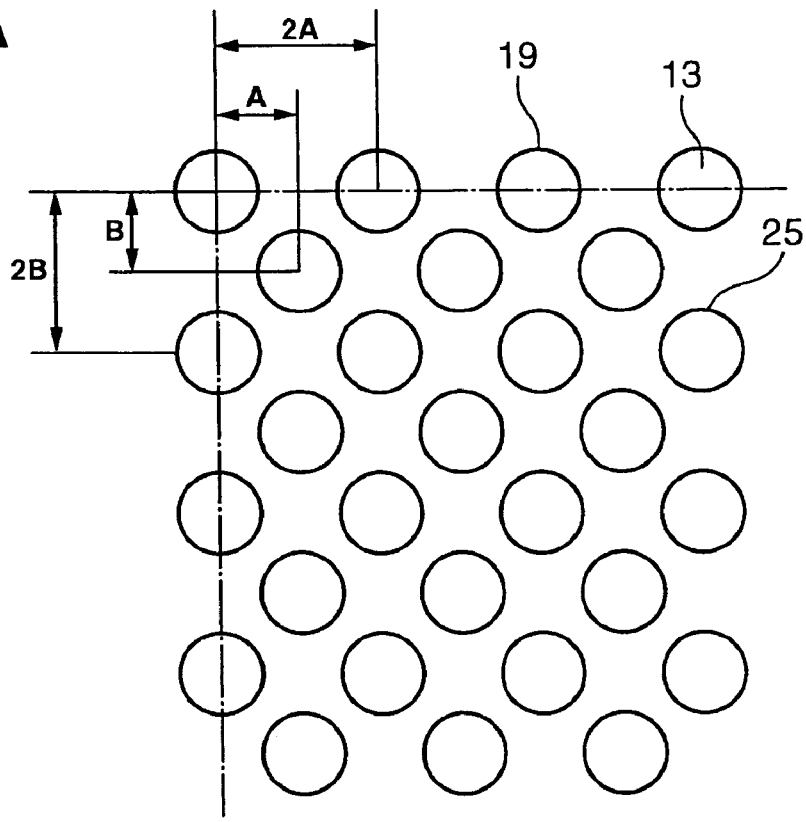
FIG. 4a is a plan view illustrating the detailed layout of the light emitting components of an organic electroluminescent array exposure head.

FIG. 4a is a plan view in which a portion of FIG. 2 is enlarged, and relates to the layout of the organic electroluminescent elements in a condensing lens array assembly 4. 19 is a light guide hole, and 13 is a condensing lens. The organic electroluminescent light emitting components are directly beneath the condensing lenses.

If we assume the resolution of this organic electroluminescent print head in the main axial direction to be 600 dpi, then the pitch A of the light emitting components is 1/600 (inch), and the pitch of the light emitting components on the same line in the main axial direction is 2A, or 1/300 (inch). If the lighting shift rate of the light emitting components in the sub-axial direction matches the paper feed rate, then the light emitting component pitch B is equal to A. An organic electroluminescent array is configured in this way, and a plurality of components are disposed in a zigzag pattern in the sub-axial direction.

Figure 4B:
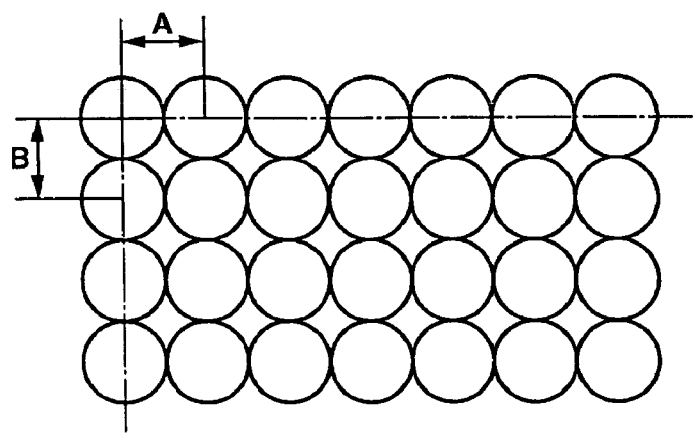

FIG. 4b is a plan view showing the results when a photosensitive material is irradiated with an organic electroluminescent print head constituted as in FIG. 4a, and shows the state of exposure at a pitch (A=B) of 600 dpi in the main and sub-axial directions.

Figure 5:
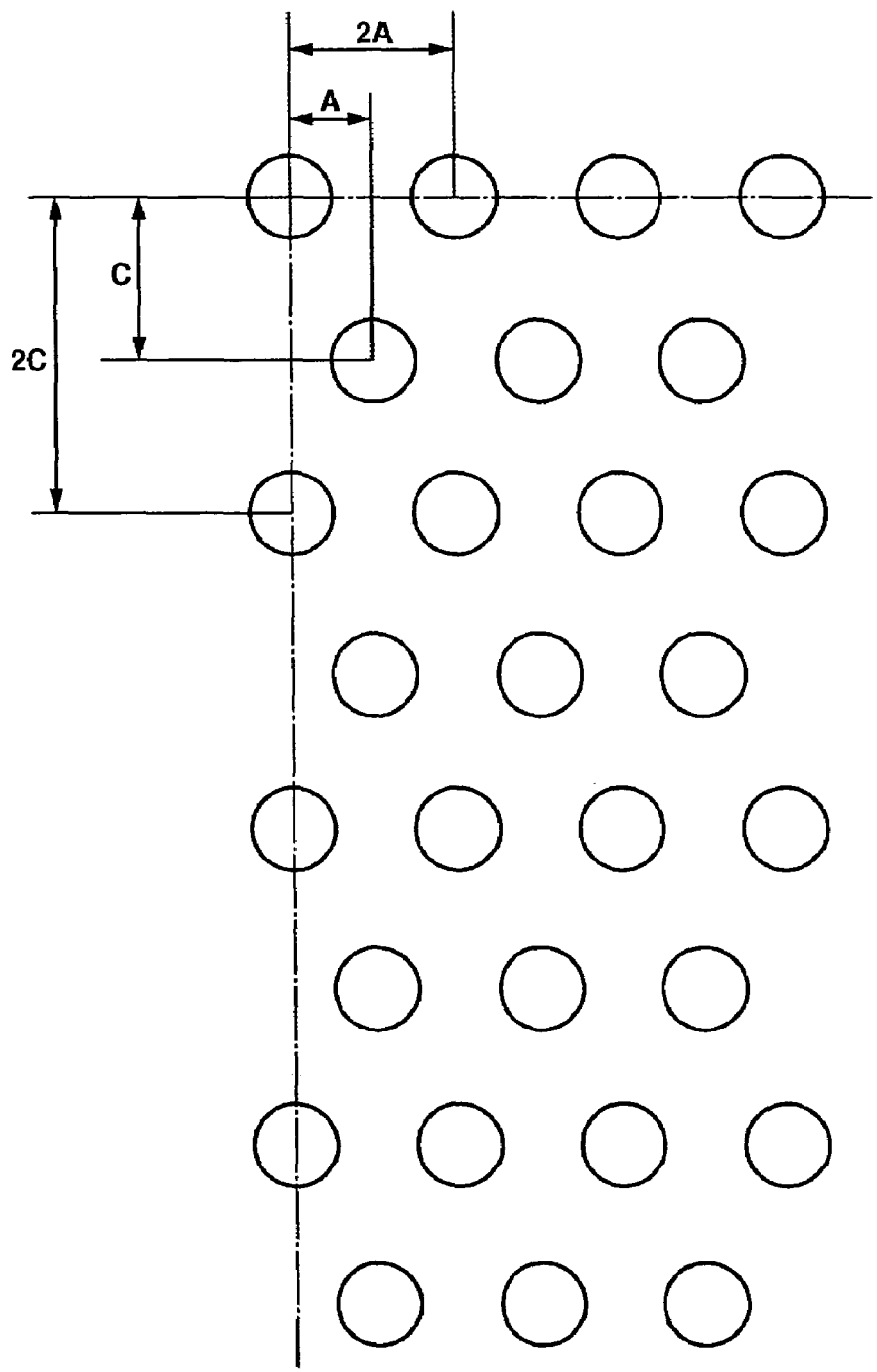

FIG. 5 is a plan view of the layout of organic electroluminescent elements pertaining to a modification of FIG. 4a. In this example, the printing resolution is 600 dpi in both the main axial direction and the sub-axial direction, but the light emitting component pitch of the organic electroluminescent head is different in the main axial direction and the sub-axial direction (A≠C) In other words, this shows the layout of organic electroluminescent elements when the paper feed rate is higher than the light emitting component lighting shift rate in the sub-axial direction, but the exposure result when a photosensitive material is irradiated exhibits a positional relationship with the light emitting components of the organic electroluminescent printhead when the exposure is performed at a pitch of 600 dpi (A=B) in the main and sub-axial directions, just as in FIG. 4b.

2. Exposure Control Circuit

Figure 6:
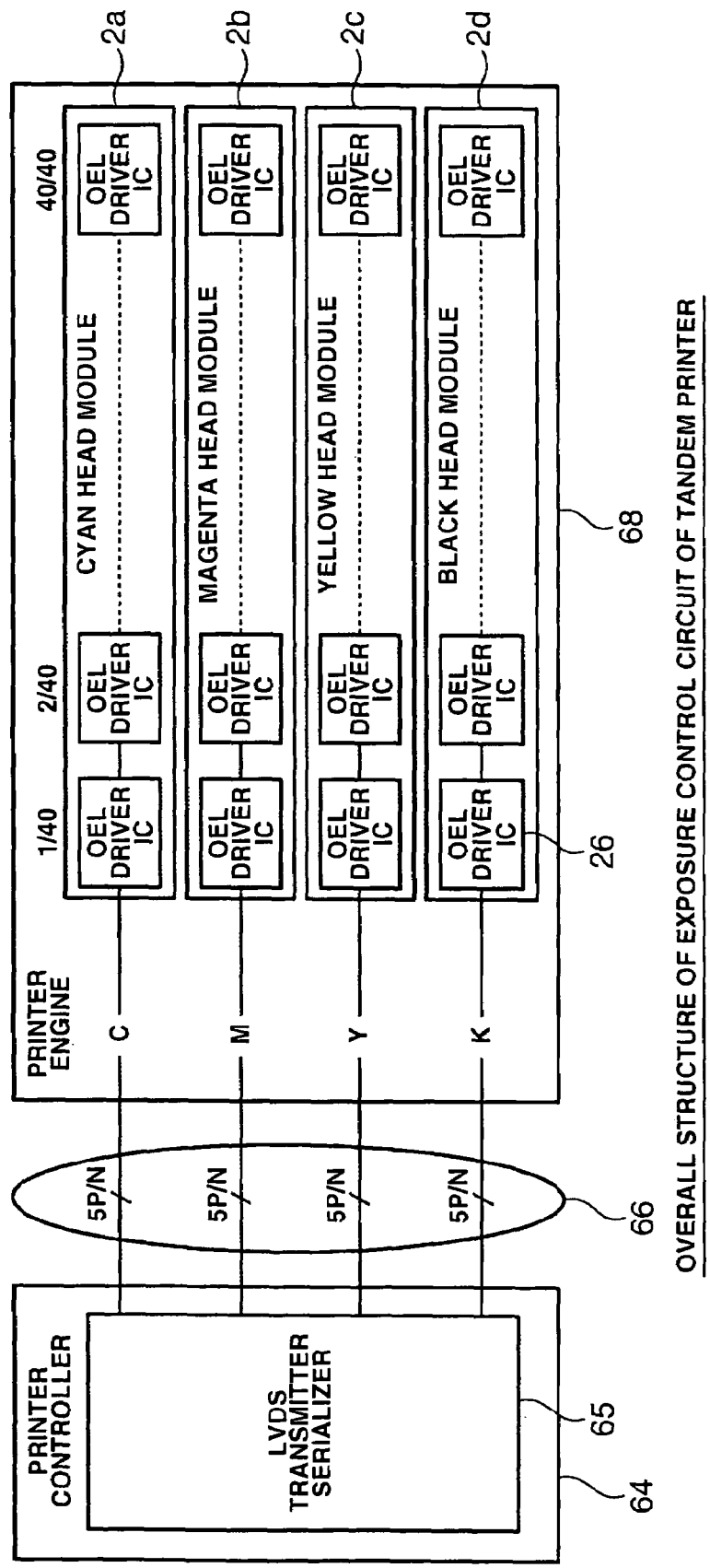
FIG. 6 is a diagram illustrating the overall structure of an exposure head control circuit in a tandem printer.

FIG. 6 illustrates an example of the configuration of the exposure control circuit of a tandem printer, focusing on the path of image data in the interior of the tandem printer. The function of the respective components will be described while following the flow of image data in this diagram.

First, the respective image data for CMYK that have undergone image processing with a print controller 64 are converted from parallel to serial form with an image data transmitter 65, and then sent as LVDS SERDES of CMYK to organic electroluminescent print heads 2 for CMYK, which are in a head controller 68 on the printer engine side. The exposure heads 2 are connected in daisy-chain fashion to a specific number of driver ICs 26. The respective driver ICs divide up and receive image data corresponding to one line in the main scanning direction, serial-parallel conversion is performed, and the data are successively stored in shift registers inside the driver ICs. After this, the organic electroluminescent elements are switched on and off in synchronization with the printing operation of the printer mechanism, and matched to the gradation values of the image data.

2a in the drawing is a cyan (C) print head, 2b is a magenta (M) print head, 2c is a yellow (Y) print head, and 2d is a black (K) print head.

Figure 7:
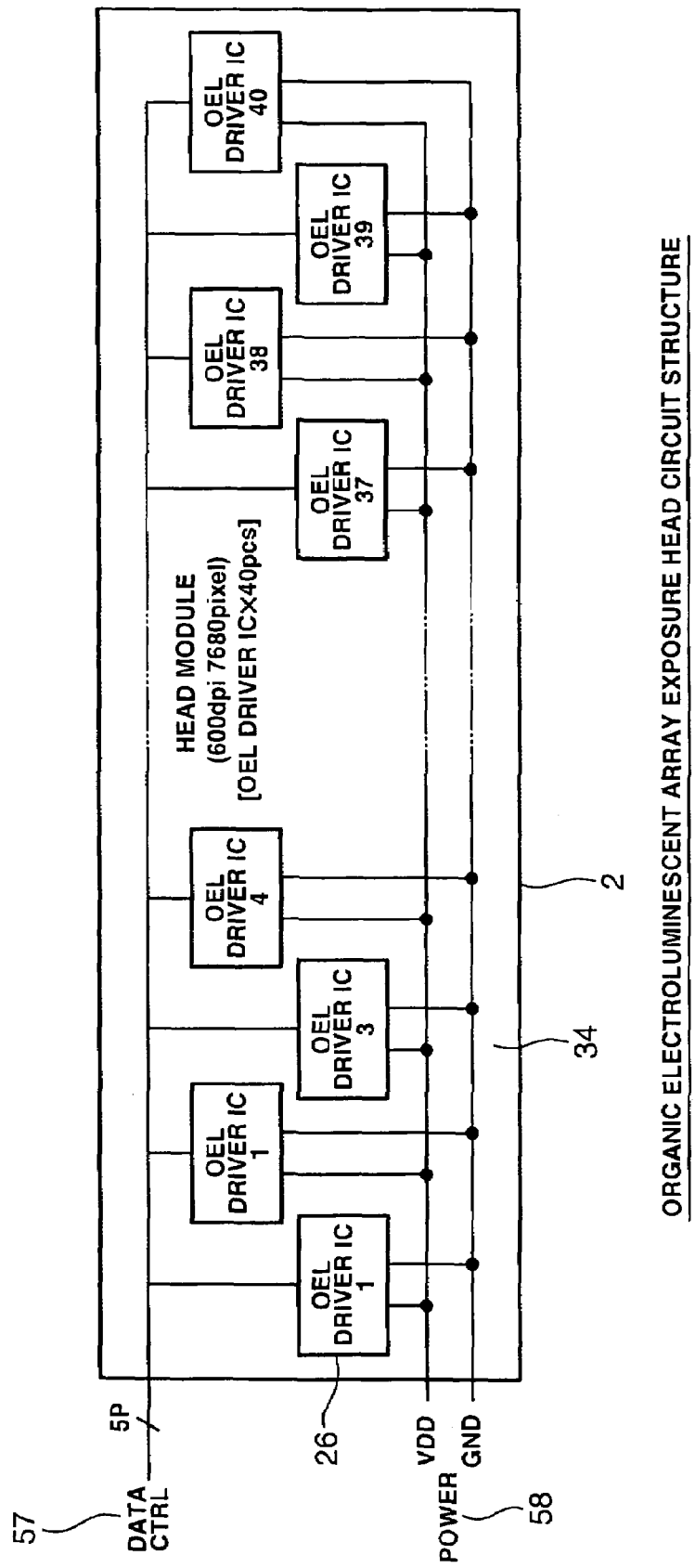
FIG. 7 is a diagram illustrating an organic electroluminescent array exposure head.

FIG. 7 illustrates the control circuit configuration of the organic electroluminescent array exposure head 2. As shown in FIG. 7, the organic electroluminescent array exposure head 2 is configured such that a specific number of driver ICs 26 are mounted on a substrate in the main scanning direction, and the individual driver ICs 26 control and drive one block of pixels in the main scanning direction and sub-scanning direction.

A data control line 57 is a signal line for linking a specific number of driver ICs 26 in the main scanning direction with the same signal line, and feeding each line of print data coming in from the printer controller to allocated driver ICs.

A power supply line 58 supplies electrical power to the specific number of driver ICs 26 disposed in the main scanning direction.

The data control line 57 and the power supply line 58 are both connected in parallel to the driver ICs as shown in FIG. 7.

Figure 8:
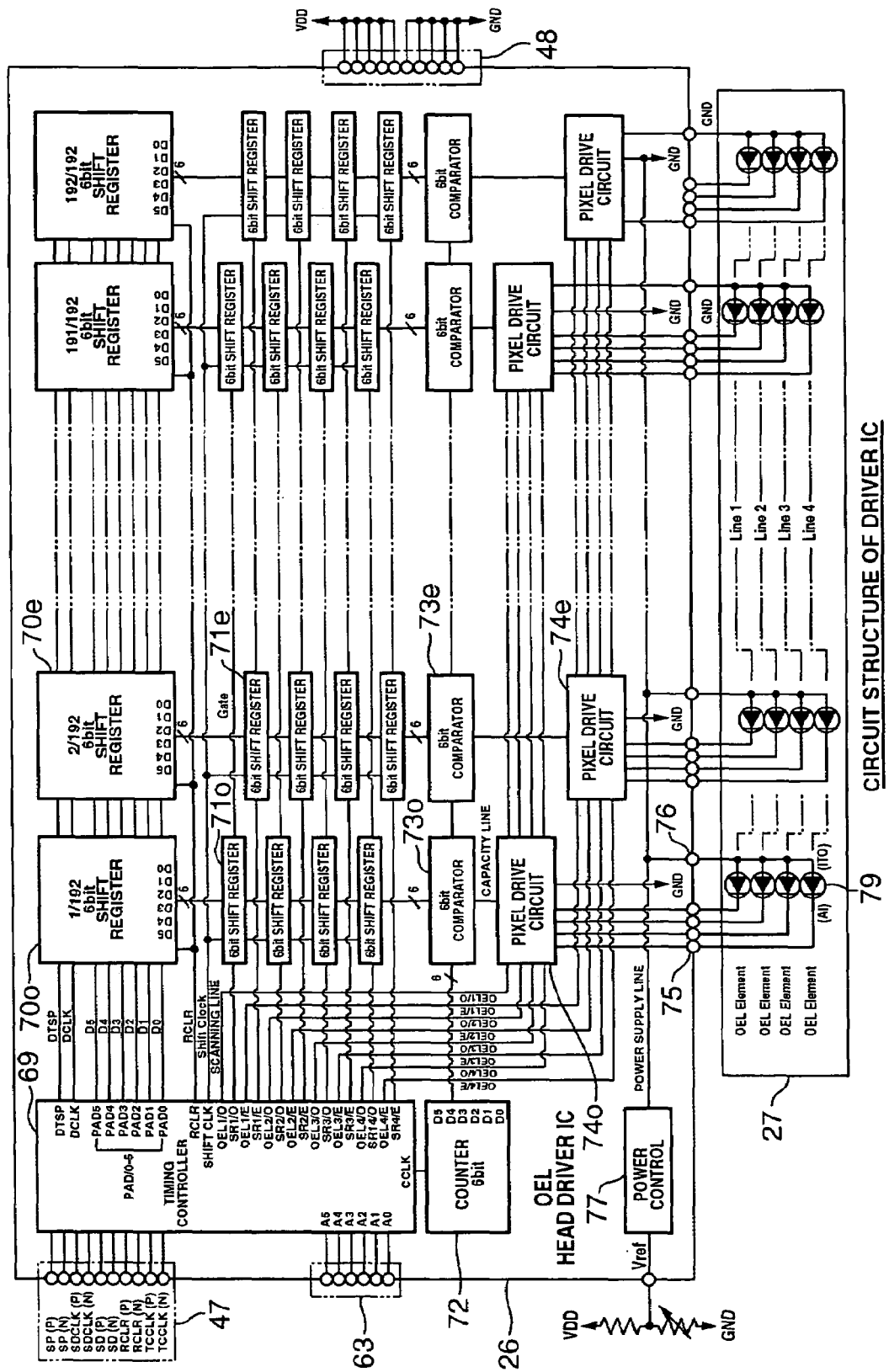
FIG. 8 is a diagram illustrating the circuit structure of a driver IC used in an organic electroluminescent array exposure head.

FIG. 8 shows the circuit structure of an organic electroluminescent array driver IC (driver IC 26). A specific number of driver ICs 26 covering the printing width in the main scanning direction are mounted on the head chip 1. In this drawing, 192 organic electroluminescent elements are controlled by a single driver IC, and while 40 driver ICs are shown here, this number can be changed. 27 in the drawing is an organic electroluminescent array, and is included to facilitate an understanding of the structure of the organic electroluminescent array handled by the driver IC. FIG. 8 shows the circuit structure of a driver IC that controls four organic electroluminescent elements aligned in the sub-scanning direction, but this number can also be changed as needed. The structure and function of the respective components will now be described by following the signal flow. Operational timing will be described through reference to FIGS. 15 to 18.

47 is a data input line, which is linked to the image data transmitter 65 on the print controller side by five sets of differential signal lines 66 as shown in FIG. 6. Inside the driver IC, this data input line is connected to the organic electroluminescent array exposure head chip 1.

48 is a power supply line pad. Half of the plurality of terminals are VDD, and half are GND.

An address setting pad 63 sets the addresses of the individual driver ICs, and in FIGS. 6 and 7, 40 driver ICs have been installed, so 40 combinations can be created. These combinations can be determined by digitally setting the address setting pad 63 on the wiring substrate to 1 or 0.

A timing controller counts the SP (P/N) signal pulses of the control line, compares this count with the set address, and accepts the data if there is a match.

69 is the timing controller. Light emission time data (gradation data) inputted from the data input line 47 are converted from serial data into 6-bit parallel data by a deserializer (not shown) in the timing controller input component, and in FIG. 8, these data are successively sent in clock synchronization to a shift register 70 (o, e) in which 192 registers extend to the right in the drawing. This shift register 70 (o, e) corresponds to the storage means of the present invention. Light emission time data of 6 bits per pixel are stored in an amount equivalent to 192 pixels (one line in the main scanning direction) in the 192 registers of the shift register 70 (o, e) in this example.

There are a total of 192 shift registers 71 (o, e), corresponding to the 192 registers of the shift register 70 (o, e) (storage means). Each of the shift registers 71 (o, e) has four registers corresponding to an organic electroluminescent array 8 contiguous in the sub-scanning direction.

The 192 registers of the shift register 70 (o, e) each output 6 bits of light emission time data to a shift register 71 (o, e). The timing controller 69 provides an SRn (o, e) signal and a SHIFT CLK signal for controlling the shift timing of the shift registers 71 (o, e), provide an OELn (o, e) signal for controlling the timing of an organic electroluminescent element drive circuit 74 (o, e), and provide a counter 72 with a count clock CCLK signal for controlling light emission time.

The shift registers 71 successively shift the light emission time data coming in from the shift register 70. Also, they output light emission time data held in selected registers to a comparator 73 (o, e) by means of the SRn (o, e) signal from the timing controller 69.

The counter 72 controls the light emission time, and the number of bits of the counter (6 bits here) is the same as the bit length of the light emission time data that fits in the shift registers 71. The input frequency of this counter is the inverse (frequency) of the result of calculating the image pitch in the sub-scanning direction as time, and dividing the period thereof by the count. The counter 72 here outputs a 6-bit count value to the comparator 73 (o, e).

The comparator 73 (o, e) compares the 6-bit count value from the counter 72 with the 6-bit light emission time data sent from the shift registers 71 (o, e) in synchronization with the timing input signal SRn (o, e) going to the shift registers 71 (o, e). The result of this comparison is that if the count value is less than the light emission time data, an ON signal is outputted to a capacity line 52. If the count value rises until it is greater than or equal to the light emission time data, an OFF signal is outputted to the capacity line 52. The capacity line 52 is linked to the organic electroluminescent element drive circuit 74 (o, e), so if the time is within the range specified by the light emission time data, an ON signal is outputted to the organic electroluminescent element drive circuit 74 (o, e), and if the light emission time has elapsed, an OFF signal is outputted. Since the light emission time data consists of 6 bits as mentioned above, $2^6=64$ gradations can be expressed depending on the length of the light emission time with respect to each pixel. The timing input signal SRn (o, e) from the timing controller 69 to the shift registers 71 (o, e) is sent at time intervals determined by dividing the clock period of the counter 72 by the number of lines in the main scanning direction. The organic electroluminescent element drive circuit 74 (o, e) performs active matrix drive of organic electroluminescent elements 79 selected by an organic electroluminescent element anode connection terminal 75 and an organic electroluminescent element cathode connection terminal 76 according to the timing signals OEL 1/O to 4/E from the timing controller 69 and the output signal (capacity line) from the comparator 73 (o, e). This circuit will be described in detail through reference to FIG. 11.

Figure 9:
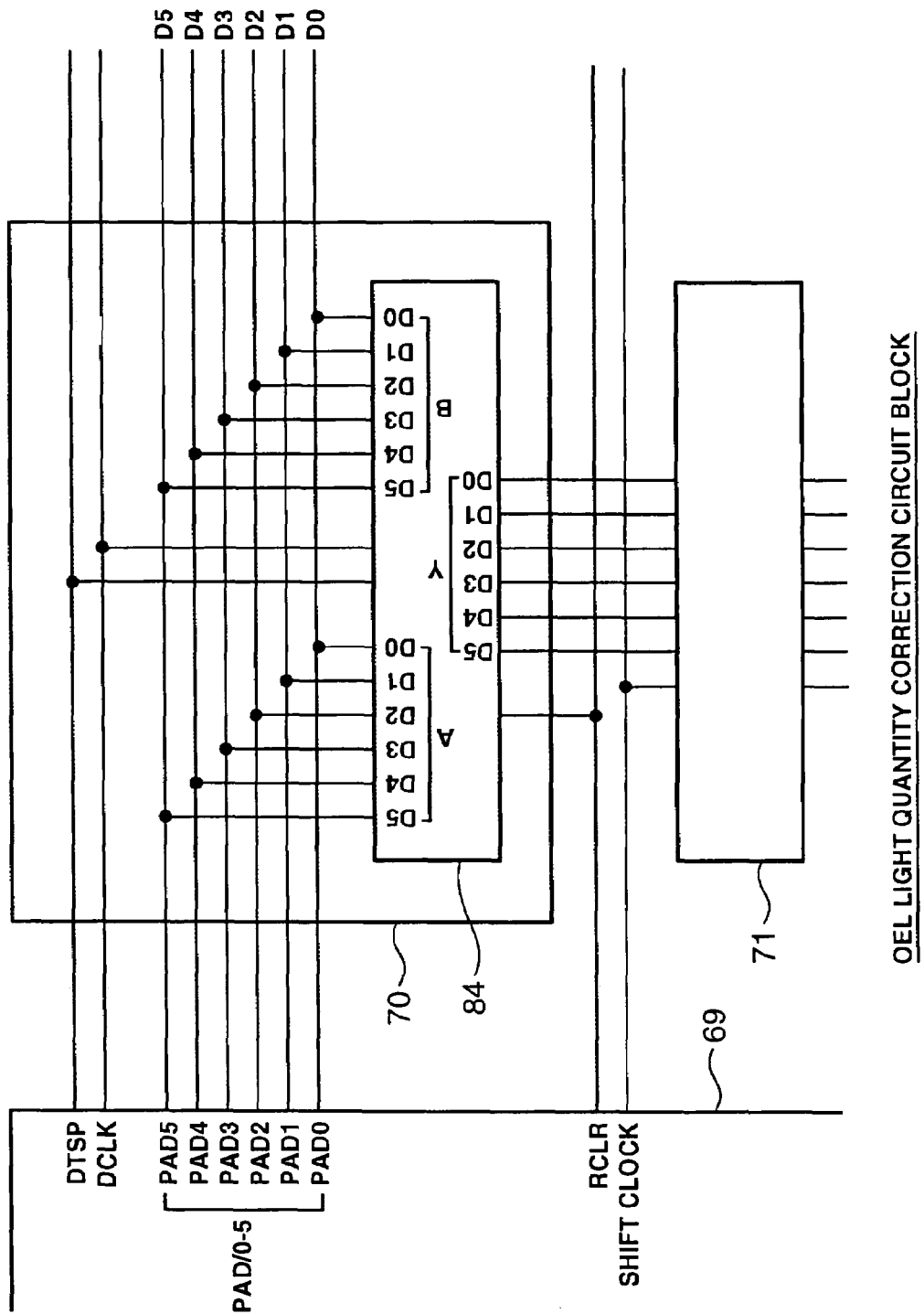
FIG. 9 is a diagram of an example of the structure of the light quantity correction circuit of organic electroluminescent elements 79.

FIG. 9 is a diagram of an example of the structure of the light quantity correction circuit of organic electroluminescent elements 79. The shift register 70 (o, e) is provided with an addition circuit 84 having inputs A and B and an output Y. With the addition circuit 84, correction data for correcting the quantity of light emission of the organic electroluminescent elements 79 are inputted to the input A, while light emission data indicating the quantity of light emission of the organic electroluminescent elements 79 are inputted to the input B. The addition circuit 84 has the function of a light emission data memory for storing light emission data, and the function of a correction data memory for storing correction data.

The 6-bit data outputted from the timing controller 69 consists of 5-bit data indicating light emission data or correction data, and 1-bit data indicating selection data. 5-bit data are supplied to terminals D0 to D4 at the inputs A and B, and selection data are supplied to a terminal D5.

In this example, the input A is enabled when the selection data indicate "0," and the input B is enabled when the selection data indicate "1." Specifically, when the selection data indicate "0," the addition circuit 84 accepts the 5-bit data outputted from the timing controller 69 as correction data at the input A. Further, the addition circuit 84 latches the received correction data. When the selection data indicates "1," the addition circuit 84 accepts this 5-bit data as light emission data at the input B. The addition circuit 84 then adds the correction data to the light emission data, and the addition result is converted into 6-bit data and supplied from the output Y to the shift registers 71. As a result, the light quantity correction circuit corrects the quantity of light of the organic electroluminescent elements 79 in the main scanning direction.

Figure 10:
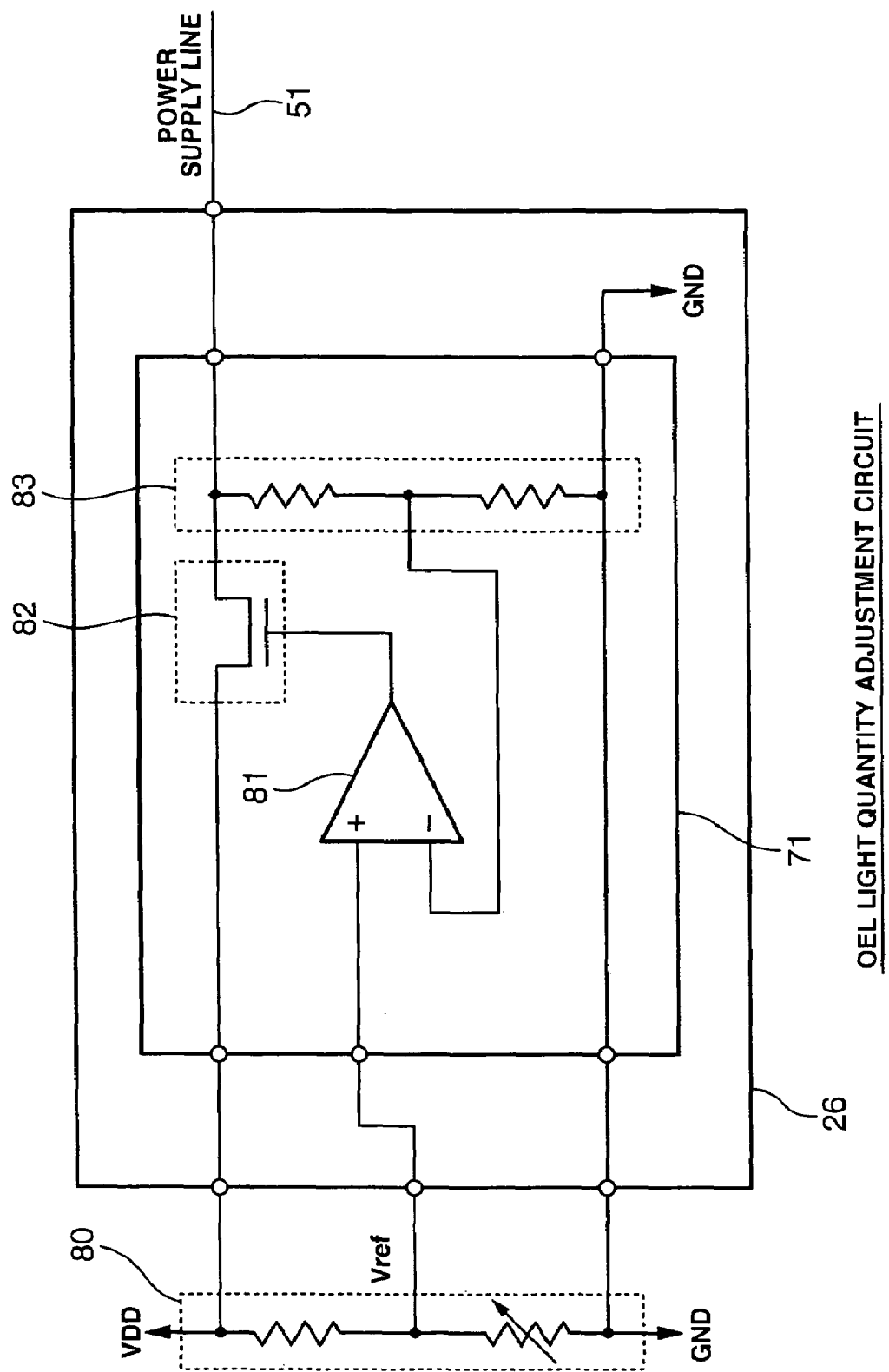
FIG. 10 is a diagram of an example of the structure of the light quantity adjustment circuit of the organic electroluminescent elements 79.

FIG. 10 is a diagram of an example of the structure of the light quantity adjustment circuit of the organic electroluminescent elements 79. This light quantity adjustment circuit has a power adjustment circuit 77 (an example of a module light emission quantity controller) and a reference voltage circuit 80 (an example of a module light emission quantity corrector), and adjusts the light emission quantity of the organic electroluminescent elements for each driver IC 26 (an example of a light emitting element module). More specifically, the power adjustment circuit 77 has the function of adjusting the power supplied through a power supply line to the organic electroluminescent element drive circuit 74 (o, e).

The reference voltage circuit 80 has a plurality of resistors connected in series between VDD and GND, and supplies the voltage of the connection point of these resistors to the power adjustment circuit 77 as reference voltage Vref. At least one of the plurality of resistors is designed such that its resistance can be trimmed. This resistor, for example, is provided to the substrate 34 (see FIG. 7) by printing or the like, and its resistance is adjusted by laser trimming. This adjustment may be performed after the organic electroluminescent array exposure head 2 has been put together.

Adjusting the resistance of the resistors provided to the reference voltage circuit 80 adjusts the voltage supplied to the organic electroluminescent elements 79 and to a power supply line 51. Specifically, the light emission quantity of the organic electroluminescent elements 79 is adjusted.

Specifically, the light quantity adjustment circuit adjusts the light emission quantity for each driver IC 26.

It is preferable if the resistors provided to the reference voltage circuit 80 have their resistance adjusted so that the light emission quantity of the organic electroluminescent elements 79 is substantially uniform between the plurality of driver ICs 26 that make up the organic electroluminescent array exposure head 2. For instance, with the plurality of driver ICs 26, the light emission quantity of the organic electroluminescent elements 79 is measured, and the resistance of the resistor of each driver IC 26 is adjusted on the basis of this light emission quantity.

The power adjustment circuit 77 has an error amplification circuit 81, a control circuit 82, and a divider circuit 83. The divider circuit 83 has a plurality of resistors connected in series between VDD and GND. Also, the divider circuit 83 supplies the error amplification circuit 81 with the voltage at the connection points of these resistors, that is, voltage obtained by dividing VDD. The error amplification circuit 81 compares the voltage divided by the divider circuit 83 with the reference voltage Vref, and supplies a specific voltage to the control circuit 82 on the basis of this comparison result.

The control circuit 82 is a MOS transistor in which VDD is supplied to either the source or the drain, and the other is connected to the power supply line 51 and one end of the divider circuit 83. A specific voltage is supplied from the error amplification circuit 81 to the gate of this MOS transistor. Specifically, the control circuit 82 controls the power supplied to the power supply line 51 on the basis of the comparison result of the error amplification circuit 81.

Figure 11:
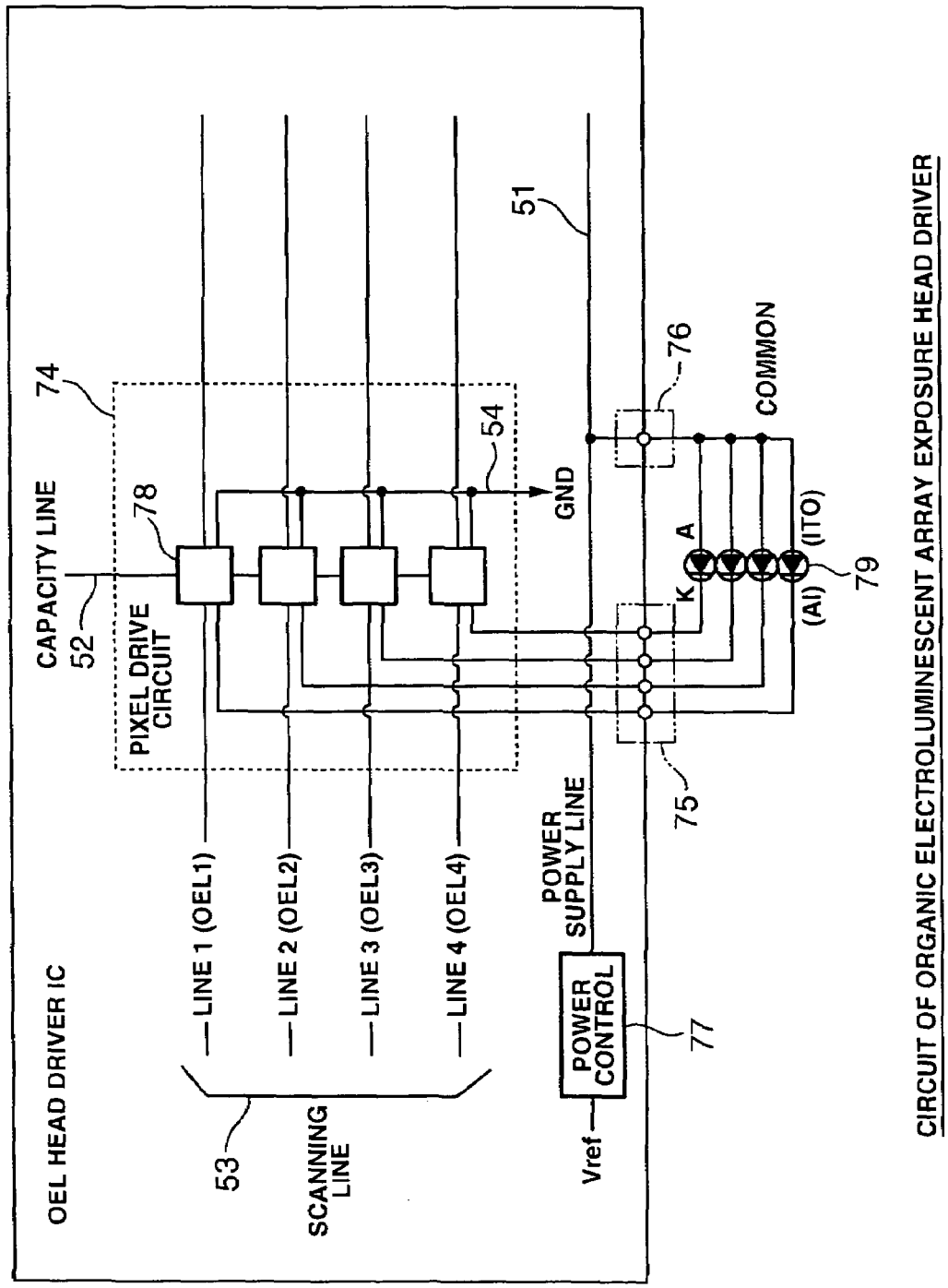
FIG. 11 is a diagram of the circuit structure of the driver of an organic electroluminescent array exposure head.

FIG. 11 shows the circuit of the driver of an organic electroluminescent array exposure head. Four organic electroluminescent element drive circuits 78 are connected corresponding to four rows of organic electroluminescent elements 79, and these constitute the organic electroluminescent element drive circuit group 74 (o, e). As shown in FIG. 8, the organic electroluminescent element drive circuit group 74 (o, e) is divided into odd- and even-numbered lines within the driver IC1.

The input of the organic electroluminescent element drive circuit group 74 (o, e) is the capacity line 52, a scanning line 53, and the power supply line 51. The capacity line 52 corresponds to the second signal line of the present invention, is connected to the output of the comparator 73. (o, e) as shown in FIG. 8, is a signal line common to the four organic electroluminescent element drive circuits 78, and controls the ON/OFF state of the organic electroluminescent elements 79. The scanning line 53 corresponds to the first signal line of the present invention, and selectively drives the organic electroluminescent element drive circuits 78 of each line by means of the timing signals OEL 1/O to 4/E (scanning line outputs) of the timing controller 69. The power supply line 51 is connected to the output of the power adjustment circuit 77, and is a drive power supply line for the organic electroluminescent elements 79.

Meanwhile, the output of the organic electroluminescent element drive circuit group 74 (o, e) drives the four organic electroluminescent elements 79. The cathode connection terminal 75 is connected to the cathodes of the organic electroluminescent elements 79, and the anode connection terminal 76 is connected to the anode side of the organic electroluminescent elements 79, and connected to the common side (power supply line).

FIG. 12 is a circuit diagram illustrating a light emitting component and the individual organic electroluminescent element drive circuit 78 used for the active matrix drive thereof. In FIG. 12, an organic electroluminescent (OEL) element 79 is used as a light emitting component. K is the cathode terminal thereof, and A is the anode terminal. The anode terminal A is connected to the power supply line 51. 53 is a scanning line, and is connected to a gate Ga of a switching transistor (Tr1). 52 is a capacity line, and is connected to a source Sa of the switching transistor Tr1. 51 is a power supply line, and Ca is a storage capacitor.

A source 5b of an organic electroluminescent driving transistor (Tr2) is grounded to GND 54, and a drain Db is connected to the organic electroluminescent cathode terminal K. A gate Gb of the driving transistor Tr2 is connected to the drain Da of the switching transistor Tr1.

The operation of the circuit shown in FIG. 12 will now be described. When the timing signals OEL 1/O to 4/E from the timing controller 69 are conducted to the scanning line 53 in a state in which the ON signal outputted from the comparator 73 (o, e) to the capacity line 52 has been applied to the source of the switching transistor Tr1, the switching transistor Tr1 is switched on. Accordingly, the gate voltage of the driving transistor Tr2 rises and there is conduction between the drain Db and the source Sb, and as a result, the organic electroluminescent element is actuated and emits a specific quantity of light. The storage capacitor Ca is charged by the voltage of the capacity line 52.

Even when the switching transistor Tr1 is off, the driving transistor Tr2 remains in a conduction state on the basis of the charge applied to the storage capacitor Ca, so the organic electroluminescent elements 79 maintain their light emitting state. Therefore, when an active matrix is applied to the drive circuit of the light emitting components formed by the array assembly 27, the sustained light emission produced by the charge of the storage capacitor Ca even after the switching transistor Tr1 has been switched off continues regardless of the signal of the capacity line 52 as long as the switching transistor Tr1 is off. Accordingly, the start and end of light emission of the organic electroluminescent elements can be controlled in time division as discussed below by using the capacity line 52 shared by the four organic electroluminescent element drive circuits 78.

When the signal outputted from the comparator 73 (o, e) to the capacity line 52 is switched to OFF, and the switching transistor Tr1 is switched on by the timing signals OEL 1/O to 4/E outputted from the timing controller 69 to the scanning line 53, the charged that had been applied to the storage capacitor Ca is absorbed through the switching transistor Tr1 into the capacity line 52. Therefore, the gate voltage of the driving transistor Tr2 drops and the light emission of the organic electroluminescent elements 79 comes to an end.

FIGS. 13 and 14 show an organic electroluminescent element drive circuit 78 pertaining to a modification of FIGS. 11 and 12. With the organic electroluminescent element drive circuit 78 in FIGS. 11 and 12, the anode terminal A of the light emitting component was shared and connected to the power supply line 51, but in FIGS. 13 and 14, the cathode terminal K is shared and connected to GND. In this case, the anode terminal A is connected to the drain Db of the driving transistor Tr2 of each of the organic electroluminescent element drive circuits 78, and the power supply line 51 is connected to the source Sb of each driving transistor Tr2. Again with this configuration, the organic electroluminescent elements are driven according to the ON/OFF signal supplied by the capacity line 52.

A driver IC1 such as this can be produced by employing known semiconductor manufacturing technology, so the manufacturing method will not be described in detail here.

3. Control Timing

FIG. 15a shows the input signal timing of the timing controller 69 in FIG. 8, and shows the timing the input signals of the driver IC. The control line of the driver IC consists of five sets of differential lines, and of these, the timing related to the acceptance of light emission time data will be described through reference to FIG. 15a.

SP (P/N) is a start signal; a pulse is generated prior to the receipt of light emission time data, and thereafter is generated for every receipt of light emission time data (192 pixels×6 bits=1152 pieces of data). The timing controller 69 counts the number of these SP (P/N) pulses, this count is compared with the address value set in this driver IC, and if there is a match, the subsequent 192×6 pieces of data are accepted.

SDCLK (P/N) is a serial data synchronization clock, and serial data are read in both the rise and the fall of this clock. The SDCLK period is obtained by dividing the maximum light emission time of each element by the number of light emitting elements in the main scanning direction, then dividing this quotient by the light emission time data width, and multiplying this quotient by the number of reads in the SDCLK period. In this drawing, the following results when a tandem color printer using A4 paper, 600 dpi, and 50 pages per minute is assumed.

Maximum light emission time: 170 μsec
Number of light emitting elements in main scanning direction: 7680
Light emission time data width: 6 bits
Number of reads in SDCLK period: 2 (twice)
SDCLK period=170 (μsec)÷7680÷6×2≈7.4 (nsec)

Therefore, the frequency of the SDCLK is approximately 135.5 MHz.

SD (P/N) is one set of 6-bit serial data (light emission time data), and is read in synchronization with the SDCLK as shown in FIG. 15a.

FIG. 15b shows the input signal timing of the timing controller 69 in FIG. 8, and shows the timing of two sets of input signals other than the input signals shown in FIG. 15a, out of the five sets of differential input signals of the driver IC.

RCLR (P/N) is the data clear signal of the shift register 70 (o, e). This pulse clears the light emission time data outputted to the shift registers 71 (o, e).

TCCLK (P/N) is a reference clock pertaining to the light emission time control of the organic electroluminescent elements controlled by the timing controller 69 in FIG. 8. This is used to determine the timing of SHIFT CLK, CCLK, OELn (o, e), and SRn (o, e).

FIG. 16 shows the transmission timing of the parallel image data (light emission time data) sent from the timing controller 69 to the shift register 70 (o, e). DTSP (P/N) is the transmission start signal of the image data, and DCLK (P/N) is a synchronization clock used during data transmission. PADn is parallel image data, and 6 bits of data are expressed in the description here. PADn is successively written to the shift register 70 (o, e) in synchronization with the rise and fall of DCLK.

Figure 17:
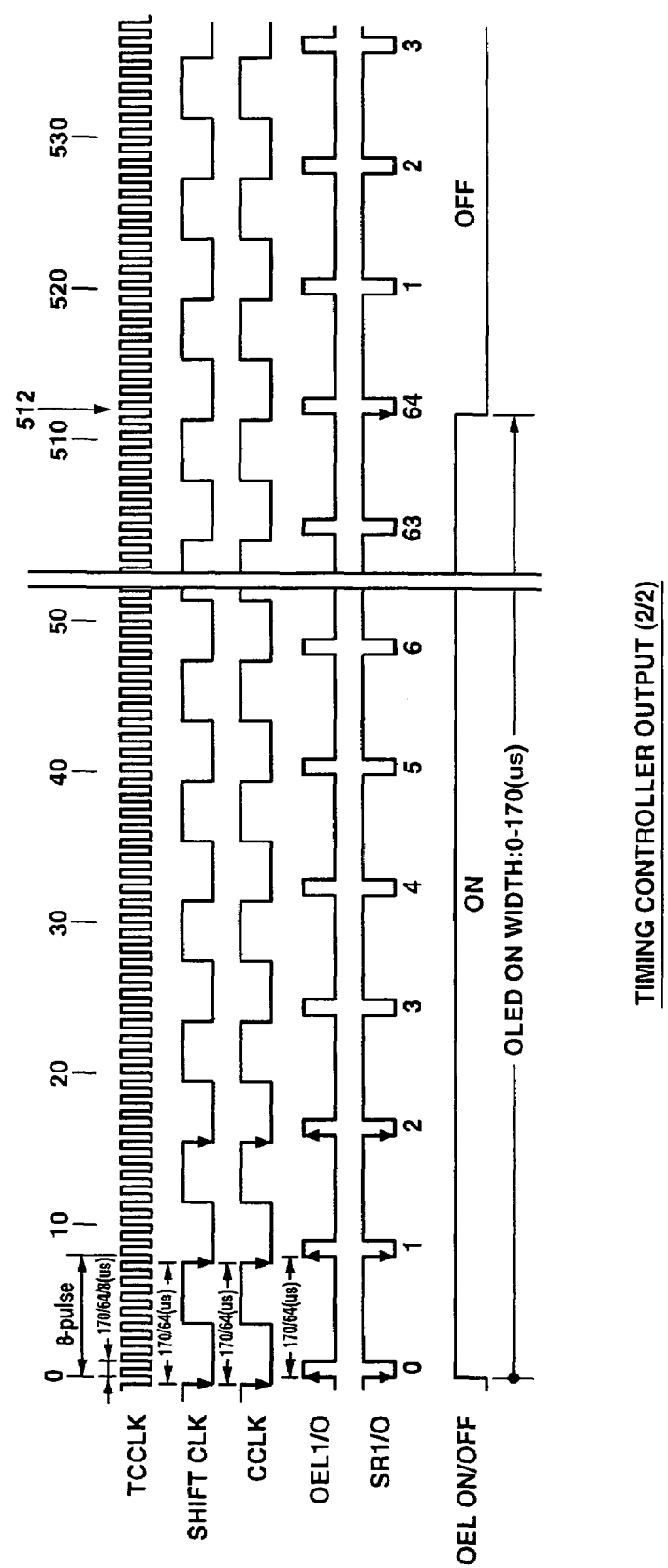
FIG. 17 is a diagram of the PWM control timing and the main signal of the portion of the organic electroluminescent array controlling electrical conduction.

FIG. 17 shows the details of the selector output signal timing of the timing controller 69 in FIG. 8.

TCCLK is a reference clock for controlling the light emission time of the organic electroluminescent elements, and is the period obtained by dividing the maximum light emission time for each element by the number of light emission time control divisions, and then dividing this quotient by the number of lines in the sub-scanning direction. In this drawing, the following results when a tandem color printer using A4 paper, 600 dpi, and 50 pages per minute is assumed.

Maximum light emission time: 170 μsec
Number of light emission time control divisions: $2^6$=64
Number of lines in the sub-scanning direction: 8
TCCLK period=170 (μsec)÷64 8≈332 (nsec)

Therefore, the frequency of the TCCLK is approximately 3 MHz.

SHIFT CLK is a clock for successively shifting the register holding value of the shift registers 71 (o, e), and is obtained by dividing the maximum light emission time for each element by the number of light emission time control divisions.

CCLK is the count input signal of the counter 72 in FIG. 8, and is the same frequency as SHIFT CLK.

The scanning line signal OEL 1/O and the register selection signal SR 1/O have the same timing, and generate pulses equivalent to one period of the TCCLK clock in synchronization with the rise of the first TCCLK after the fall of SHIFT CLK.

The ON/OFF of OEL indicates the ON time (light emission time) of the organic electroluminescent elements 79 in FIG. 8, and in the case of this example, the light emission time width is from 0 μsec to a maximum light emission time of 170 μsec.

The light emission operation will be described through reference to these signals. The light emission time data outputted from the first register of the shift register 710 by the register selection signal SR 1/O are compared with the count value, and an ON or OFF signal is outputted to the capacity line 52. Meanwhile, at the same timing as this, the scanning line signal OEL 1/O is outputted at regular time intervals to the first organic electroluminescent element drive circuit 78.

As discussed above, if the capacity line 52 is ON when the scanning line signal OEL 1/O is ON, the OEL is switched ON, and the organic electroluminescent element 79 is lighted. Even if the scanning line signal OEL 1/O is switched OFF, the organic electroluminescent element 79 remains lit. Furthermore, if the capacity line 52 is OFF when the scanning line signal OEL 1/O has been switched ON, the OEL is switched OFF, and the organic electroluminescent element 79 is extinguished.

FIG. 18 shows the signal timing of the light emitting element drive circuit and the selector of the timing controller 69 in FIG. 8. In FIG. 17, the description of the basic operation was for OEL 1/O and SR 1/O, but in FIG. 18, the description is of the light emission control timing of eight lines of organic electroluminescent elements, including both even- and odd-numbered lines in the sub-scanning direction.

The scanning line signal OEL n/O and the register selection signal SR n/O have the same timing, and generate pulses equivalent to one period of the TCCLK clock in synchronization with the rise of the n-th TCCLK after the fall of SHIFT CLK. The register selection signal SR n/O selects the n-th line of registers of the shift registers 71 (see FIG. 8), so the light emission time data outputted from those registers are compared with the count value by the comparator 73, and an ON or OFF signal is outputted to the capacity line 52. Meanwhile, at the same timing as this, the scanning line signal OEL n/O selects the n-th organic electroluminescent element scanning line (see FIG. 8). As discussed above, only when a scanning line has been selected can the organic electroluminescent element drive circuits 78 switch the organic electroluminescent elements ON or OFF according to the state of the capacity line 52 at that time. Therefore, a plurality of organic electroluminescent element drive circuits 78 can be driven in time division by shifting the selection timing of the scanning line connected to the other organic electroluminescent element drive circuits sharing the capacity line 52.

Once all light emission has ended on the basis of the light emission time data of each register of the shift registers 71, the light emission time data of each register of the shift registers 71 are shifted to the next register and similarly lighted at very 64 pulses of the SHIFT CLK. At this point, the same pixels on the photosensitive material can be subjected to multiple exposure on the basis of the same light emission time data by moving the relative positions of the photosensitive material and the organic electroluminescent array in the sub-scanning direction.

In this embodiment, the ON and OFF states of a plurality of organic electroluminescent elements are controlled in time division, so all of them can be put in a light emitting state at the same point in time. On the other hand, if it takes a long time to rewrite the data in the shift registers 71, this can hinder the lighting of the organic electroluminescent elements, but with this embodiment, one line of data are first stored in the shift register 70 (storage means), and then all the data are shifted at once to the shift registers 71, so data rewrite can be accomplished in a short enough time to pose no hindrance to the lighting of the organic electroluminescent elements.

Also, with this embodiment, the common comparator 73 is connected via the capacity line 52 to the plurality of organic electroluminescent element drive circuits 78. In this embodiment, the register selection signal SR n/O and the scanning line signal OEL n/O are synchronized, and the selection timing of the scanning line connected to the other organic electroluminescent element drive circuits 78 that share the comparator 73 is shifted, so even though the comparator 73 is shared, a plurality of organic electroluminescent element drive circuits 78 can be driven at different light emission times.

Also, with this embodiment, a common counter 72 is connected to the plurality of comparators 73o and 73e. As shown in FIGS. 17 and 18, all of the light emission time data and the counter output are compared by the register selection signal SRn during the counter clock CCLK1 period, so even though the counter 72 is shared, gradation control is possible on the basis of individual light emission time data.

We claim:

1. A control device for an optical head, which successively lights in a sub-scanning direction the respective light emitting elements of a light emitting element matrix in which a plurality of light emitting element groups arranged in the sub-scanning direction are further arranged in a main scanning direction, and subjects each of the plurality of pixels disposed in the main scanning direction to multiple exposure, comprising:

a storage unit for receiving pixel data for each pixel and storing data corresponding to the plurality of pixels disposed in the main scanning direction;

a shift register group consisting of a plurality of shift registers respectively corresponding to the plurality of pixels disposed in the main scanning direction, each shift register having a plurality of registers respectively corresponding to the light emitting element groups arranged in the sub-scanning direction, each shift register receiving the data for each pixel stored in the storage unit, and said shift register group successively shifting the data of each register within the shift register; and an element drive circuit for lighting the corresponding light emitting elements on the basis of the data in each register of the shift register, wherein the light emitting elements are driven by the element drive circuit that relays the light emission state from the receipt of a light emission start signal until the receipt of a light emission end signal, and the light emission start signal and the light emission end signal for the element drive circuit of each light emitting element are each transmitted by a time division signal, wherein the element drive circuit is equipped with a plurality of first signal lines and with second signal lines that intersect with the first signal lines, and is constituted such that the light emission of the light emitting elements located at the intersections between two signal lines is started and ended by switching the second signal lines on or off when the first signal lines are active, and the start and end of the light emission of the respective light emitting elements are controlled by synchronizing the on/off state of the second signal lines with the active signal output to the first signal lines, and shifting the active signal output time to the first signal lines for another element drive circuit that shares the second signal lines.

2. The control device for an optical head according to claim 1, further comprising a comparator for comparing the data in the respective registers of the shift register with the output of a counter of the same number of bits as each register, and outputting the result to the second signal lines, the counter being shared with another element drive circuit that shares the second signal lines, and the period of the counter being longer than the shift in the output time of the active signals to the plurality of first signal lines.

3. The control device for an optical head according to claim 2, wherein the comparator is shared with another element drive circuit that shares the second signal lines, and the comparison of the data acquisition of each register with the counter is synchronized with the active signal output to the first signal lines.

4. An optical head, comprising:

a light emitting element group having a plurality of light emitting elements arranged in a specific direction;

a plurality of light emitting data memories provided corresponding to the plurality of light emitting elements, for storing light emission data indicating the light emission time of the corresponding light emitting elements;

a plurality of correction data memories provided corresponding to the plurality of light emitting elements, for storing correction data correcting the light emission times of the corresponding light emitting elements;

a light emission data correction unit for correcting the light emission data corresponding to the correction data on the basis of said correction data; and an element drive circuit for lighting the light emitting elements on the basis of the corrected light emission data.

5. The optical head according to claim 4, wherein the plurality of correction data memories store the correction data for the light emitting elements corresponding to the respective correction data memories, by successively shifting the correction data to said plurality of correction data memories, the plurality of light emission data memories store the light emission data for the light emitting elements corresponding to the respective light emission data memories, by successively shifting the light emission data to the plurality of light emission data memories when the correction data have been stored in the plurality of correction data memories, and the element drive circuit lights the plurality of light emitting elements when the plurality of correction data memories have shifted the plurality of light emission data and stored them in the plurality of light emission data memories.

6. The optical head according to claim 4, further comprising:

a controller for producing a plurality of bit data composed of a plurality of bits, as the light emission data or the correction data; and a plurality of shift registers provided corresponding to the plurality of light emitting elements, for successively shifting the plurality of bit data, wherein the correction data memories store said bit data as correction data when a specific bit in the bit data stored in the corresponding shift registers exhibits a specific value, and the light emission data memories store said bit data as the light emission data when the specific bit in the bit data stored in the corresponding shift registers exhibits another value.

7. The optical head according to claim 4, wherein the light emission data correction unit has an addition unit for correcting light emission data by adding the correction data to the light emission data.

8. An optical head according to any of claims 4 to 7 wherein the light emitting elements are organic electroluminescent elements.

9. An optical head comprising:

a light emitting element group having a plurality of light emitting elements arranged in a specific direction;

a storage unit having a plurality of memories provided corresponding to the plurality of light emitting elements, for storing light emission data indicating the light emission time of the plurality of light emitting elements; and an element drive circuit for lighting the plurality of light emitting elements on the basis of the light emission data when corresponding light emission data have been stored in the respective plurality of memories, wherein the storage unit is a first shift register for successively shifting the light emission data to the plurality of memories, and the element drive circuit lights the plurality of light emitting elements when the first shift register has shifted the plurality of light emission data and stored them in the plurality of memories;

a light emitting element matrix in which a plurality of the light emitting element groups arranged in the specific direction are arranged in a direction substantially perpendicular to said specific direction; and a plurality of second shift registers provided corresponding to the plurality of memories, wherein the second shift registers have a plurality of registers provided corresponding to the respective plurality of light emitting elements arranged in the substantially perpendicular direction in the light emitting element matrix, and the light emission data stored in the memories corresponding to said second shift registers are successively shifted and stored in the plurality of registers, and the element drive circuit lights the light emitting elements corresponding to the registers on the basis of the light emission data stored in said registers.

10. The optical head according to claim 9, further comprising:

a counter for keeping a count value that controls the light emission time of the light emitting elements; and a plurality of comparators provided corresponding to the respective plurality of second shift registers, for comparing the light emission data stored in a specific register, out of the corresponding plurality of registers, with the count value of the counter, wherein the element drive circuit starts or stops the lighting of the light emitting elements corresponding to the specific register when the comparators have determined that the count value matches the light emission data.

11. A control device for an optical head, comprising:

a light emitting element group having a plurality of light emitting elements arranged in a specific direction; a plurality of memories provided corresponding to the plurality of light emitting elements, for storing light emission data indicating the light emission time of the plurality of light emitting elements;

a counter for keeping a count value that controls the light emission time of the light emitting elements;

a plurality of comparators provided corresponding to the respective plurality of memories, for comparing the light emission data stored in the corresponding memories with the count value of the counter; and an element drive circuit for controlling the lighting of the light emitting elements corresponding to a specific memory on the basis of the result of the comparators comparing the count value with the light emission data stored in said specific memory;

a light emitting element matrix in which a plurality of the light emitting element groups arranged in the specific direction are arranged in a direction substantially perpendicular to said specific direction; and a plurality of second shift registers provided corresponding to the plurality of memories and the plurality of comparators, wherein the second shift registers have a plurality of registers provided corresponding to the respective plurality of light emitting elements arranged in the substantially perpendicular direction in the light emitting element matrix, and the light emission data stored in the memories corresponding to said second shift registers are successively shifted and stored in the plurality of registers, the comparators compare the count value with the light emission data stored in a specific register out of the plurality of registers, and the element drive circuit controls the lighting of the light emitting elements corresponding to a specific register on the basis of the result of the comparators comparing the count value with the light emission data stored in said specific register.

12. The optical head according to claim 11, wherein the element drive circuit starts or stops the lighting of the light emitting elements when the count value matches the light emission data.

13. The optical head according to claim 11, wherein the element drive circuit controls the light emitting elements so that one operation of either starting or stopping the lighting of the light emitting elements is performed when the count value matches the light emission data, and controls the light emitting elements so that the other operation of starting or stopping the lighting of the light emitting elements is performed when the count value matches a predetermined value.

* * * * *